(12) United States Patent
Savage et al.

(10) Patent No.: US 11,775,609 B2
(45) Date of Patent: Oct. 3, 2023

(54) AGGREGATING SPARSE NON-CONGRUENT SIMULATION TRIALS

(71) Applicant: ANALYCORP, INC., Palo Alto, CA (US)

(72) Inventors: Sam Savage, Palo Alto, CA (US); Jordan Alen, Mt. Shasta, CA (US)

(73) Assignee: ANALYCORP, INC., Palo Alto, CA (US)

( * ) Notice: Subject to any disclaimer, the term of this patent is extended or adjusted under 35 U.S.C. 154(b) by 994 days.

(21) Appl. No.: 16/447,742

(22) Filed: Jun. 20, 2019

(65) Prior Publication Data

US 2019/0392021 A1 Dec. 26, 2019

Related U.S. Application Data

(60) Provisional application No. 62/831,105, filed on Apr. 8, 2019, provisional application No. 62/687,690, filed on Jun. 20, 2018.

(51) Int. Cl.
   G06F 17/18 (2006.01)
(52) U.S. Cl.
   CPC .................................. G06F 17/18 (2013.01)
(58) Field of Classification Search
   CPC ...................................................... G06F 17/18
   See application file for complete search history.

(56) References Cited

U.S. PATENT DOCUMENTS

| | | | |
|---|---|---|---|
| 7,526,413 | B2 | 4/2009 | Dahlberg |
| 2005/0131663 | A1 | 6/2005 | Bangs et al. |
| 2008/0126024 | A1 | 5/2008 | Gottsman |
| 2009/0177611 | A1 | 7/2009 | Savage |
| 2011/0153272 | A1 | 6/2011 | Tiwary |
| 2012/0290274 | A1 | 11/2012 | Seningen |
| 2013/0066679 | A1 | 3/2013 | Welch et al. |
| 2013/0185039 | A1 | 7/2013 | Tesauro et al. |
| 2014/0278306 | A1 | 9/2014 | Taghavi et al. |
| 2015/0234955 | A1 | 8/2015 | Joshi et al. |
| 2017/0308630 | A1* | 10/2017 | Savage .................. G06F 30/20 |
| 2018/0341744 | A1* | 11/2018 | Regev .................... G06N 7/005 |

OTHER PUBLICATIONS

Anonymous, "SparseIntArray | Android Developers", (Apr. 17, 2016), URL: https://web.archive.org/web/20160417053053/http://developer.android.com/reference/android/util/SparseIntArray.html, (Oct. 29, 2019), XP055636670, 8 pages.

(Continued)

*Primary Examiner* — Bijan Mapar
(74) *Attorney, Agent, or Firm* — FisherBroyles, LLP

(57) ABSTRACT

A method of efficiently modeling changes to mitigation of an occurrence of a rare event for a number of simulation trials includes obtaining or generating a number of sparse simulation trials of a simulation including a total number of simulation trials (x) associated with the N occurrences of a rare event, assigning fractions of 1/N to N/N to the sparse simulation trials, filtering the sparse simulation trials by the assigned fractions by a percentage corresponding to y/N to simulate a mitigation of the likelihood of failure, and outputting sparse simulation trials that are less than the percentage to statistically represent the effects of the mitigation on the total number of trials.

8 Claims, 35 Drawing Sheets

(56) References Cited

OTHER PUBLICATIONS

Supplementary European Search Report, EP Application No. 17786779.3, dated Nov. 14, 2019, 8 pages.
International Search Report and Written Opinion for PCT/US2017/029003, dated Aug. 1, 2017, 6 pages.
International Preliminary Report on Patentability for PCT/US2017/029003, dated May 22, 2018, 10 pages.
Hesterberg, "Advances in Importance Sampling," PhD Thesis, Stanford University, Jun. 29, 2003, 26 pages.
"Oracle Crystal Ball, Fusion Edition" by Oracle, Release 11.1.2 [retrieved on Oct. 30, 2019], Retrieved from <https://www.hearne.software/getattachment/ef9f1967-3137-4e71-a744-75bc22a1f490/Support-Documentation-Crystal-Ball-11-1-2-User-Gui.aspx> (Year: 2010), 426 pages. [Table of Contents Submitted—Complete Copy Available On Request].
"Analytic Solver Platform XLMiner Platform Data Mining User Guide" [user guide], Version 2015-R2, 694 pp: Frontline Systems, Inc. [retrieved on Oct. 30, 2019]. Retrieved from <http://web2.utc.edu/-fgg366/4270/4270Notes/XLMiner/XLMinerUserGuide.pdf> (Year: 2015), 694 pages. [Table of Contents Submitted—Complete Copy Available Upon Request].
Rao et al. "Quantification of epistemic and aleatory uncertainties in level-1 probabilistic safety assessment studies" Reliability Engineering and System Safety, vol. 92, pp. 947-956 [retrieved on May 11, 2018]. Retrieved from <https://www.sciencedirect.com/science/article/pii/S0951832006001505> (Year: 2007), 10 pages.
Shahabuddin, P. "Rare Event Simulation in Stochastic Models" Winter Simulation Conference; doi: 10.1109/WSC.1995.478721 [retrieved on Nov. 9, 2019], Retrieved from <https://ieeexplore.ieee.org/document/478721/> (Year: 1995), 8 pages.
Espinoza et al. "Using DNPV for valuing investments in the energy sector: A solar project case study" Renewable Energy, vol. 75, pp. 44-49 [retrieved on Oct. 30, 2019], Retrieved from <https://www.sciencedirect.com/science/article/pii/S0960148114005618> (Year: 2015), 6 pages.
White, A. "A Statistics of Rare Events Method for Transportation" 2001 IEEE Aerospace Conference Proceedings; DOI: 10.1109/AERO.2001.931422 [retrieved on Nov. 9, 2019]. Retrieved from <http://ieeexplore.ieee.org/document/931422/> (Year: 2001), 7 pages.
Salis et al. "Multiscale Hy3S: Hybrid stochastic simulation for supercomputers" BWC Bioinformatics, vol. 7, Issue 93, pp. 21; doi: 10.1186/1471-2105-7-93 [retrieved on Nov. 8, 2019]. Retrieved from <https://www.ncbi.nlm.nih.gov/pubmed/16504125> (Year: 2006), 21 pages.

\* cited by examiner

| Trials between 1 and 1 million | | |
|---|---|---|
| Component | Trial Number | Damage |
| 1 | 113,598 | 2.75 |
| 1 | 117,243 | 5.35 |
| 1 | 223,456 | 4.01 |
| 1 | 370,051 | 4.98 |
| 1 | 428,090 | 3.60 |
| 1 | 546,995 | 4.17 |
| 1 | 549,506 | 6.52 |
| 1 | 667,448 | 0.58 |
| 1 | 685,054 | 0.27 |
| 1 | 870,810 | 1.10 |

*Fig. 2A*

| Trials between 1 and 1 thousand | | |
|---|---|---|
| Component | Trial Number | Damage |
| 2 | 42 | 1.00 |
| 2 | 52 | 1.90 |
| 2 | 129 | 1.80 |
| 2 | 223 | 0.17 |
| 2 | 244 | 0.17 |
| 2 | 484 | 0.20 |
| 2 | 692 | 0.91 |
| 2 | 744 | 0.88 |
| 2 | 750 | 0.97 |
| 2 | 954 | 0.20 |

*Fig. 2B*

| Trials between 1 and 1 Million | | | | |
|---|---|---|---|---|
| Component | Trial Numbers | | | Damage |
| 2 | 42,000 | to | 42,999 | 1.00 |
| 2 | 52,000 | to | 52,999 | 1.90 |
| 2 | 129,000 | to | 129,999 | 1.80 |
| 2 | 223,000 | to | 223,999 | 0.17 |
| 2 | 244,000 | to | 244,999 | 0.17 |
| 2 | 484,000 | to | 484,999 | 0.20 |
| 2 | 692,000 | to | 692,999 | 0.91 |
| 2 | 744,000 | to | 744,999 | 0.88 |
| 2 | 750,000 | to | 750,999 | 0.97 |
| 2 | 954,000 | to | 954,999 | 0.20 |

*Fig. 2C*

| Trials between 1 and 1 million | | | Trials between 1 and 1 Million | | | | |
|---|---|---|---|---|---|---|---|
| Component | Trial Number | Damage | Component | Trial Numbers | | | Damage |
| 1 | 113,598 | 2.75 | 2 | 42,000 | to | 42,999 | 1.00 |
| 1 | 117,243 | 5.35 | 2 | 52,000 | to | 52,999 | 1.90 |
| 1 | 223,456 | 4.01 | 2 | 129,000 | to | 129,999 | 1.80 |
| 1 | 370,051 | 4.98 | 2 | 223,000 | to | 223,999 | 0.17 |
| 1 | 428,090 | 3.60 | 2 | 244,000 | to | 244,999 | 0.17 |
| 1 | 546,995 | 4.17 | 2 | 484,000 | to | 484,999 | 0.20 |
| 1 | 549,506 | 6.52 | 2 | 692,000 | to | 692,999 | 0.91 |
| 1 | 667,448 | 0.58 | 2 | 744,000 | to | 744,999 | 0.88 |
| 1 | 685,054 | 0.27 | 2 | 750,000 | to | 750,999 | 0.97 |
| 1 | 870,810 | 1.10 | 2 | 954,000 | to | 954,999 | 0.20 |

*Fig. 2D*

| Trials between 1 and 1 Million | | | | | |
|---|---|---|---|---|---|
| Component | Trial Numbers | | | Damage | |
| 2 | 42,000 | to | 42,999 | 1.00 | |
| 2 | 52,000 | to | 52,999 | 1.90 | |
| 2 | 129,000 | to | 129,999 | 1.80 | |
| 2 | 223,000 | to | 223,999 | 0.17 | 1 |
| 2 | 244,000 | to | 244,999 | 0.17 | |
| 2 | 484,000 | to | 484,999 | 0.20 | |
| 2 | 692,000 | to | 692,999 | 0.91 | |
| 2 | 744,000 | to | 744,999 | 0.88 | |
| 2 | 750,000 | to | 750,999 | 0.97 | |
| 2 | 954,000 | to | 954,999 | 0.20 | |

*Fig. 2E*

| Trials between 1 and 1 Million | | | | |
|---|---|---|---|---|
| Component | Trial Numbers | | Damage | Weight in millionths |
| 2 | 42,000 | to 42,999 | 1.00 | 1,000 |
| 2 | 52,000 | to 52,999 | 1.90 | 1,000 |
| 2 | 129,000 | to 129,999 | 1.80 | 1,000 |
| 2 | 223,000 | to 223,455 | 0.17 | 456 |
| 2 | 223,456 | | 0.17 | 1 |
| 2 | 223,457 | to 223,999 | 0.17 | 543 |
| 2 | 244,000 | to 244,999 | 0.17 | 1,000 |
| 2 | 484,000 | to 484,999 | 0.20 | 1,000 |
| 2 | 692,000 | to 692,999 | 0.91 | 1,000 |
| 2 | 744,000 | to 744,999 | 0.88 | 1,000 |
| 2 | 750,000 | to 750,999 | 0.97 | 1,000 |
| 2 | 954,000 | to 954,999 | 0.20 | 1,000 |

*Fig. 2F*

| Component | Trial Numbers | Damage | Weight in millionths |
|---|---|---|---|
| 2 | 42,000 | 1.00 | 1,000 |
| 2 | 52,000 | 1.90 | 1,000 |
| 2 | 129,000 | 1.80 | 1,000 |
| 2 | 223,000 | 0.17 | 456 |
| 2 | 223,456 | 0.17 | 1 |
| 2 | 223,457 | 0.17 | 543 |
| 2 | 244,000 | 0.17 | 1,000 |
| 2 | 484,000 | 0.20 | 1,000 |
| 2 | 692,000 | 0.91 | 1,000 |
| 2 | 744,000 | 0.88 | 1,000 |
| 2 | 750,000 | 0.97 | 1,000 |
| 2 | 954,000 | 0.20 | 1,000 |

*Fig. 2G*

| Trials between 1 and 1 million | | | |
|---|---|---|---|
| Component | Trial Number | Damage | P |
| 1 | 113,598 | 2.75 | 1/9 |
| 1 | 117,243 | 5.35 | 2/9 |
| 1 | 223,456 | 4.01 | 3/9 |
| 1 | 370,051 | 4.98 | 4/9 |
| 1 | 428,090 | 3.60 | 5/9 |
| 1 | 546,995 | 4.17 | 6/9 |
| 1 | 549,506 | 6.52 | 7/9 |
| 1 | 667,448 | 0.58 | 8/9 |
| 1 | 685,054 | 0.27 | 9/9 |
| N=9 | | | |

*Fig. 4A*

| Trials between 1 and 1 million | | | |
|---|---|---|---|
| Component | Trial Number | Damage | P |
| ~~1~~ | ~~113,598~~ | ~~2.75~~ | ~~1/9~~ |
| ~~1~~ | ~~117,243~~ | ~~5.35~~ | ~~2/9~~ |
| ~~1~~ | ~~223,456~~ | ~~4.01~~ | ~~3/9~~ |
| 1 | 370,051 | 4.98 | 4/9 |
| 1 | 428,090 | 3.60 | 5/9 |
| 1 | 546,995 | 4.17 | 6/9 |
| 1 | 549,506 | 6.52 | 7/9 |
| 1 | 667,448 | 0.58 | 8/9 |
| 1 | 685,054 | 0.27 | 9/9 |
| N=9 | | | |

*Fig. 4B*

| Asset_ID | Trial_ID | Impact | Fixed LoF Mitigation |
|---|---|---|---|
| 1 | 949053 | 10 | 1 |
| 1 | 271334 | 10 | 1 |
| 1 | 955823 | 10 | 0 |
| 1 | 847496 | 10 | 0 |
| 2 | 366595 | 20 | 0 |
| 2 | 334068 | 20 | 0 |
| 2 | 688669 | 20 | 0 |
| 3 | 281319 | 15 | 1 |
| 3 | 666872 | 15 | 1 |
| 3 | 926757 | 15 | 1 |
| 3 | 32918 | 15 | 1 |
| 3 | 526387 | 15 | 0 |
| 3 | 598530 | 15 | 0 |

*Fig. 5A*

| Asset_ID | Trial_ID | Impact | Fixed LoF Mitigation |
|---|---|---|---|
| 1 | 949053 | 10 | 1 |
| 1 | 271334 | 10 | 0.75 |
| 1 | 955823 | 10 | 0.5 |
| 1 | 847496 | 10 | 0.25 |
| 2 | 366595 | 20 | 0 |
| 2 | 334068 | 20 | 0 |
| 2 | 688669 | 20 | 0 |
| 3 | 281319 | 15 | 1 |
| 3 | 666872 | 15 | 0.833 |
| 3 | 926757 | 15 | 0.667 |
| 3 | 32918 | 15 | 0.500 |
| 3 | 526387 | 15 | 0.333 |
| 3 | 598530 | 15 | 0.167 |

*Fig. 5B*

| Asset_ID | Trial_ID | Impact | Imp_M1 |
|---|---|---|---|
| 1 | 949053 | 10 | 0 |
| 1 | 271334 | 10 | 0 |
| 1 | 955823 | 10 | 0 |
| 1 | 847496 | 10 | 0 |
| 2 | 366595 | 20 | 0 |
| 2 | 334068 | 20 | 0 |
| 2 | 688669 | 20 | 0 |
| 3 | 281319 | 15 | 0 |
| 3 | 666872 | 15 | 0 |
| 3 | 926757 | 15 | 0 |
| 3 | 32918 | 15 | 0 |
| 3 | 526387 | 15 | 0 |
| 3 | 598530 | 15 | 0 |
| 1 | 949053 | 10 | 1 |
| 1 | 271334 | 10 | 1 |
| 1 | 955823 | 10 | 1 |
| 1 | 847496 | 10 | 1 |
| 2 | 366595 | 18 | 1 |
| 2 | 334068 | 18 | 1 |
| 2 | 688669 | 18 | 1 |
| 3 | 281319 | 15 | 1 |
| 3 | 666872 | 15 | 1 |
| 3 | 926757 | 15 | 1 |
| 3 | 32918 | 15 | 1 |
| 3 | 526387 | 15 | 1 |
| 3 | 598530 | 15 | 1 |

*Fig. 5C*

| Asset_ID | Trial_ID | Impact | Imp_M1 | Imp_M2 |
|---|---|---|---|---|
| 1 | 949053 | 10 | 0 | 1 |
| 1 | 271334 | 10 | 0 | 1 |
| 1 | 955823 | 10 | 0 | 1 |
| 1 | 847496 | 10 | 0 | 1 |
| 2 | 366595 | 20 | 1 | 0 |
| 2 | 334068 | 20 | 1 | 0 |
| 2 | 688669 | 20 | 1 | 0 |
| 3 | 281319 | 15 | 0 | 1 |
| 3 | 666872 | 15 | 0 | 1 |
| 3 | 926757 | 15 | 0 | 1 |
| 3 | 32918 | 15 | 0 | 1 |
| 3 | 526387 | 15 | 0 | 1 |
| 3 | 598530 | 15 | 0 | 1 |
| 2 | 366595 | 12 | 2 | 0 |
| 2 | 334068 | 12 | 2 | 0 |
| 2 | 688669 | 12 | 2 | 0 |
| 3 | 281319 | 8 | 2 | 2 |
| 3 | 666872 | 8 | 2 | 2 |
| 3 | 926757 | 8 | 2 | 2 |
| 3 | 32918 | 8 | 2 | 2 |
| 3 | 526387 | 8 | 2 | 2 |
| 3 | 598530 | 8 | 2 | 2 |
| 1 | 949053 | 7 | 0 | 2 |
| 1 | 271334 | 7 | 0 | 2 |
| 1 | 955823 | 7 | 0 | 2 |
| 1 | 847496 | 7 | 0 | 2 |

*Fig. 5D*

| Asset_ID | Trial_ID | Impact | Imp_M1 |
|---|---|---|---|
| 1 | 949053 | 10 | 0 |
| 1 | 271334 | 10 | 0 |
| 1 | 955823 | 10 | 0 |
| 1 | 847496 | 10 | 0 |
| 2 | 366595 | 20 | 1 |
| 2 | 334068 | 20 | 1 |
| 2 | 688669 | 20 | 1 |
| 3 | 281319 | 15 | 0 |
| 3 | 666872 | 15 | 0 |
| 3 | 926757 | 15 | 0 |
| 3 | 32918 | 15 | 0 |
| 3 | 526387 | 15 | 0 |
| 3 | 598530 | 15 | 0 |
| 2 | 366595 | | 2 |
| 2 | 334068 | | 2 |
| 2 | 688669 | | 2 |
| 2 | 366595 | | 3 |
| 2 | 334068 | | 3 |
| 2 | 688669 | | 3 |

*Fig. 5E*

| Asset_ID | Trail_ID | Impact | LoF_M1 | Imp_M2 | Imp_M3 |
|---|---|---|---|---|---|
| 1 | 949053 | 10 | 1 | 0 | 1 |
| 1 | 271334 | 10 | 0.75 | 0 | 1 |
| 1 | 955823 | 10 | 0.5 | 0 | 1 |
| 1 | 847496 | 10 | 0.25 | 0 | 1 |
| 1 | 366595 | 20 | 0 | 1 | 0 |
| 1 | 334068 | 20 | 0 | 1 | 0 |
| 1 | 688669 | 20 | 0 | 1 | 0 |
| 1 | 281319 | 15 | 0 | 0 | 1 |
| 1 | 666872 | 15 | 0 | 0 | 1 |
| 1 | 926757 | 15 | 0 | 0 | 1 |
| 1 | 32918 | 15 | 0 | 0 | 1 |
| 1 | 526387 | 15 | 0 | 0 | 1 |
| 1 | 598530 | 15 | 0 | 0 | 1 |
| 1 | 366595 | 16 | 0 | 2 | 0 |
| 1 | 334068 | 16 | 0 | 2 | 1 |
| 1 | 688669 | 16 | 0 | 2 | 0 |
| 1 | 281319 | 7.5 | 0 | 0 | 2 |
| 1 | 666872 | 7.5 | 0 | 0 | 2 |
| 1 | 926757 | 7.5 | 0 | 0 | 2 |
| 1 | 32918 | 7.5 | 0 | 0 | 2 |
| 1 | 526387 | 7.5 | 0 | 0 | 2 |
| 1 | 598530 | 7.5 | 0 | 0 | 2 |
| 1 | 949053 | 8 | 1 | 0 | 1 |
| 1 | 949053 | 8 | 0.75 | 0 | 2 |
| 1 | 955823 | 8 | 0.5 | 0 | 2 |
| 1 | 847496 | 8 | 0.25 | 0 | 2 |

*Fig. 5F*

| Asset_ID | Trial_ID | Impact | LoF_M1 | Imp_M2 | Imp_M3 |
|---|---|---|---|---|---|
| 1 | 949053 | 10 | 1 | 0 | 1 |
| 1 | 271334 | 10 | 0.75 | 0 | 1 |
| 1 | 955823 | 10 | 0.5 | 0 | 1 |
| 1 | 847496 | 10 | 0.25 | 0 | 1 |
| 2 | 366595 | 20 | 0 | 1 | 0 |
| 2 | 334068 | 20 | 0 | 1 | 0 |
| 2 | 688669 | 20 | 0 | 1 | 0 |
| 3 | 281319 | 15 | 0 | 0 | 1 |
| 3 | 666872 | 15 | 0 | 0 | 1 |
| 3 | 926757 | 15 | 0 | 0 | 1 |
| 3 | 32918 | 15 | 0 | 0 | 1 |
| 3 | 526387 | 15 | 0 | 0 | 1 |
| 3 | 598530 | 15 | 0 | 0 | 1 |
| 2 | 366595 | 12 | 0 | 2 | 0 |
| 2 | 334068 | 12 | 0 | 2 | 0 |
| 2 | 688669 | 12 | 0 | 2 | 0 |
| 3 | 281319 | 7 | 0 | 0 | 2 |
| 3 | 666872 | 7 | 0 | 0 | 2 |
| 3 | 926757 | 7 | 0 | 0 | 2 |
| 3 | 32918 | 7 | 0 | 0 | 2 |
| 3 | 526387 | 7 | 0 | 0 | 2 |
| 3 | 598530 | 7 | 0 | 0 | 2 |
| 1 | 949053 | 8 | 1 | 0 | 2 |
| 1 | 271334 | 8 | 0.75 | 0 | 2 |
| 1 | 955823 | 8 | 0.5 | 0 | 2 |
| 1 | 847496 | 8 | 0.25 | 0 | 2 |
| 2 | 366595 | 8 | 0 | 3 | 0 |
| 2 | 334068 | 8 | 0 | 3 | 0 |
| 2 | 688669 | 8 | 0 | 3 | 0 |

*Fig. 5G*

| AssetID | ILI Project | ILI Perm |
|---|---|---|
| 151 | 1 | 0.2 |
| 151 | 1 | 0.4 |
| 151 | 1 | 0.6 |
| 151 | 1 | 0.8 |
| 151 | 1 | 1 |
| 207 | 1 | 0.25 |
| 207 | 1 | 0.5 |
| 207 | 1 | 0.75 |
| 207 | 1 | 1 |
| 1600 | 2 | 1 |
| 2265 | 2 | 0.33 |
| 2265 | 2 | 0.67 |
| 2265 | 2 | 1 |

*Fig. 5H*

| Asset | Unmitigated | Mitigation1 | Mitigation2 |
|---|---|---|---|
| 1 | 20 | 80% | 100% |
| 2 | 30 | 25% | 100% |
| 3 | 50 | 100% | 50% |

| Asset | Trial | CoF | CM1 | CM2 | Adj CoF |
|---|---|---|---|---|---|
| 1 | 413221 | 20 | 1 | 0 | 4 |
| 1 | 988449 | 20 | 1 | 0 | 4 |
| 1 | 364791 | 20 | 1 | 0 | 4 |
| 1 | 220694 | 20 | 0 | 1 | 0 |
| 1 | 535266 | 30 | 0 | 1 | 0 |
| 1 | 553422 | 30 | 0 | 1 | 0 |
| 1 | 14343 | 30 | 0 | 1 | 0 |
| 1 | 885265 | 30 | 0 | 1 | 0 |
| 1 | 836242 | 30 | 0 | 1 | 0 |
| 1 | 694480 | 30 | 0 | 1 | 0 |
| 1 | 88350 | 30 | 0 | 1 | 0 |
| 1 | 557227 | 50 | 1 | 0 | 0 |
| 1 | 367871 | 50 | 1 | 0 | 0 |
| 1 | 184729 | 50 | 1 | 0 | 0 |
| 1 | 984247 | 50 | 1 | 0 | 0 |
| 1 | 67307 | 50 | 1 | 0 | 0 |
| 1 | 552524 | 50 | 1 | 0 | 0 |

*Fig. 51*

|  | Asset1 | Consequence | Trial | P1 | P2 | P3 |
|---|---|---|---|---|---|---|
| Asset1 Row 1 | 1 | 20 | 47741 | 7/N |  | 10/N |
| Asset1 Row 2 | 1 | 20 | 419560 | 23/N |  | 42/N |
| Asset1 Row 3 | 1 | 20 | 332125 | 1/N |  | 75/N |
| Asset1 Row 4 | 1 | 20 | 118104 | 78/N |  | 67/N |
|  | ⋮ | ⋮ | ⋮ | ⋮ |  | ⋮ |
|  |  | ⋮ | ⋮ | ⋮ |  | ⋮ |
|  |  | ⋮ | ⋮ | ⋮ |  | ⋮ |
| Asset1 Row N-2 | 1 | 20 | 109359 | N/N=1 |  | 30/N |
| Asset1 Row N-1 | 1 | 20 | 677263 | 88/N |  | 14/N |
| Asset1 Row N | 1 | 20 | 244469 | 5/N |  | 70/N |
| Asset2 Row 1 | 2 | 30 | 620149 |  | 9/M | 70/M |
| Asset2 Row 2 | 2 | 30 | 338484 |  | 67/M | 2/M |
|  |  | ⋮ | ⋮ |  | ⋮ | ⋮ |
| Asset2 Row M-1 | 2 | 30 | 921895 |  | M/M=1 | 17/M |
| Asset2 Row M | 2 | 30 | 678329 |  | 1/M | 8/M |

*Fig. 7A*

|  | Asset1 | Consequence | Trial | P1 | P2 | P3 |
|---|---|---|---|---|---|---|
| Asset1 Row 1 | 1 | 20 | 47741 | 7/100 |  |  |
| Asset1 Row 2 | 1 | 20 | 419560 | 23/100 |  |  |
| Asset1 Row 3 | 1 | 20 | 332125 | 1/100 |  |  |
| Asset1 Row 4 | 1 | 20 | 118104 | 78/100 |  |  |
|  | . | . | . | . |  |  |
|  | . | . | . | . |  |  |
|  | . | . | . | . |  |  |
| Asset1 Row N-2 | 1 | 20 | 109359 | 100/100 =1 |  |  |
| Asset1 Row N-1 | 1 | 20 | 677263 | 88/100 |  |  |
| Asset1 Row N | 1 | 20 | 244469 | 5/100 |  |  |

*Fig. 7B*

|             | Asset1 | Consequence | Trial  | P1        | P2 | P3 |
|-------------|--------|-------------|--------|-----------|----|----|
| Asset1 Row 1 | 1      | 20          | 47741  | 7/100     |    |    |
| Asset1 Row 2 | 1      | 20          | 419560 | 23/100    |    |    |
| Asset1 Row 3 | 1      | 20          | 332125 | 1/100     |    |    |
| ~~Asset1 Row 4~~ | ~~1~~  | ~~20~~      | ~~118104~~ | ~~78/100~~ |    |    |
| . | . | . | . |  |  |  |
| . | . | . | . |  |  |  |
| . | . | . | . |  |  |  |
| ~~Asset1 Row N-2~~ | ~~1~~ | ~~20~~ | ~~109359~~ | ~~100/100 =1~~ | | |
| ~~Asset1 Row N-1~~ | ~~1~~ | ~~20~~ | ~~677263~~ | ~~88/100~~ | | |
| Asset1 Row N | 1 | 20 | 244469 | 5/100 | | |

*Fig. 7C*

| | SIP(A) Value | Weight | Mean | Sigma | P(A)< |
|---|---|---|---|---|---|
| | | | 1.2270 | 6.3026 | 84% |
| | | | | | |
| 1 | 8.0542 | 1.33% | 0.1074 | 0.6215 | |
| 2 | 4.5336 | 1.33% | 0.0604 | 0.1458 | |
| 3 | 5.1068 | 1.33% | 0.0681 | 0.2007 | |
| 4 | 6.0692 | 1.33% | 0.0809 | 0.3126 | |
| 5 | 6.9399 | 1.33% | 0.0925 | 0.4352 | |
| 6 | 5.0836 | 1.33% | 0.0678 | 0.1983 | |
| 7 | 4.7539 | 1.33% | 0.0634 | 0.1659 | |
| 8 | 3.8389 | 1.33% | 0.0512 | 0.0910 | |
| 9 | 6.6006 | 1.33% | 0.0880 | 0.3850 | |
| 10 | 7.2236 | 1.33% | 0.0963 | 0.4795 | |
| 11 | 6.4361 | 1.33% | 0.0858 | 0.3618 | |
| 12 | 7.1368 | 1.33% | 0.0952 | 0.4657 | |
| 13 | 7.2832 | 1.33% | 0.0971 | 0.4890 | |
| 14 | 7.0955 | 1.33% | 0.0946 | 0.4592 | |
| 15 | 5.8676 | 1.33% | 0.0782 | 0.2871 | |
| 16 | 0.0000 | 80.00% | 0.0000 | 1.2044 | |
| | | | | | |
| | Total Weight | 100.00% | | | |

*Fig. 8A*

| Trial # | SIP(A) Value | Weight |
|---|---:|---:|
| 1 | 8.0542 | 1.33% |
| 2 | 4.5336 | 1.33% |
| 3 | 5.1068 | 1.33% |
| 4 | 6.0692 | 1.33% |
| 5 | 6.9399 | 1.33% |
| 6 | 5.0836 | 1.33% |
| 7 | 4.7539 | 1.33% |
| 8 | 3.8389 | 1.33% |
| 9 | 6.6006 | 1.33% |
| 10 | 7.2236 | 1.33% |
| 11 | 6.4361 | 1.33% |
| 12 | 7.1368 | 1.33% |
| 13 | 7.2832 | 1.33% |
| 14 | 7.0955 | 1.33% |
| 15 | 5.8676 | 1.33% |
| 16 | 0.0000 | 80.00% |
|  | Total Weight | 100.00% |

*Fig. 9A*

| Trial # | SIP(B) Value | Weight |
|---|---:|---:|
| 1 | 11.1251 | 0.05% |
| 2 | 9.6848 | 0.05% |
| 3 | 12.1186 | 0.05% |
| 4 | 13.1861 | 0.05% |
| 5 | 10.9111 | 0.05% |
| 6 | 5.3907 | 0.05% |
| 7 | 12.2982 | 0.05% |
| 8 | 13.2701 | 0.05% |
| 9 | 12.2122 | 0.05% |
| 10 | 12.4478 | 0.05% |
| 11 | 13.6262 | 0.05% |
| 12 | 14.4362 | 0.05% |
| 13 | 15.5638 | 0.05% |
| 14 | 7.5226 | 0.05% |
| 15 | 11.4942 | 0.05% |
| 16 | 13.4752 | 0.05% |
| 17 | 15.5445 | 0.05% |
| 18 | 15.0302 | 0.05% |
| 19 | 15.0718 | 0.05% |
| 20 | 11.7716 | 0.05% |
| 21 | 0.0000 | 99% |
|  | Total Weight | 100.00% |

*Fig. 9B*

| Trial # | Weighted SIP(A+B) Value | Weight |
|---|---|---|
|  | 8.0542 | 1.33% |
| 1 | 4.5336 | 1.33% |
| 2 | 5.1068 | 1.33% |
| 3 | 6.0692 | 1.33% |
| 4 | 6.9399 | 1.33% |
| 5 | 5.0836 | 1.33% |
| 6 | 4.7539 | 1.33% |
| 7 | 3.8389 | 1.33% |
| 8 | 6.6006 | 1.33% |
| 9 | 7.2236 | 1.33% |
| 10 | 6.4361 | 1.33% |
| 11 | 7.1368 | 1.33% |
| 12 | 7.2832 | 1.33% |
| 13 | 7.0955 | 1.33% |
| 14 | 5.8676 | 1.33% |
| 15 | 11.1251 | 0.05% |
| 16 | 9.6848 | 0.05% |
| 17 | 12.1186 | 0.05% |
| 18 | 13.1861 | 0.05% |
| 19 | 10.9111 | 0.05% |
| 20 | 5.3907 | 0.05% |
| 21 | 12.2982 | 0.05% |
| 22 | 13.2701 | 0.05% |
| 23 | 12.2122 | 0.05% |
| 24 | 12.4478 | 0.05% |
| 25 | 13.6262 | 0.05% |
| 26 | 14.4362 | 0.05% |
| 27 | 15.5638 | 0.05% |
| 28 | 7.5226 | 0.05% |
| 29 | 11.4942 | 0.05% |
| 30 | 13.4752 | 0.05% |
| 31 | 15.5445 | 0.05% |
| 32 | 15.0302 | 0.05% |
| 33 | 15.0718 | 0.05% |
| 34 | 11.7716 | 0.05% |
| 35 | 0 | 79% |
|  | Total Weight | 100.00% |

*Fig. 9C*

| Elements of Mitigation1 | | |
|---|---|---|
| Asset | LoF Red. | CoF Red. |
| 123 | 10% | 30% |

| Elements of Mitigation1 | | |
|---|---|---|
| Asset | LoF Red. | CoF Red. |
| 2033 | 50% | 40% |

| Elements of Mitigation2 | | |
|---|---|---|
| Asset | LoF Red. | CoF Red. |
| 2033 | 20% | 40% |

*Fig. 11A*

| Trial | Asset | CoF | Permuted Fractions | LoF1 Reduction | CoF1 Reduction | MIT1 Vector | Permuted Fractions | LoF2 Reduction | CoF2 Reduction | MIT2 Vector | Effective CoF |
|---|---|---|---|---|---|---|---|---|---|---|---|
| 61 | Asset123 | 7 | 0.6 | 1 | 30% | 70% | | | | | 4.9 |
| 679 | Asset123 | 7 | 0.1 | 0 | 30% | 0% | | | | | 0 |
| 917 | Asset123 | 7 | 0.4 | 1 | 30% | 70% | | | | | 4.9 |
| 722 | Asset123 | 7 | 0.8 | 1 | 30% | 70% | | | | | 4.9 |
| 455 | Asset123 | 7 | 0.7 | 1 | 30% | 70% | | | | | 4.9 |
| 580 | Asset123 | 7 | 0.3 | 1 | 30% | 70% | | | | | 4.9 |
| 596 | Asset123 | 7 | 0.5 | 1 | 30% | 70% | | | | | 4.9 |
| 491 | Asset123 | 7 | 0.9 | 1 | 30% | 70% | | | | | 4.9 |
| 80 | Asset123 | 7 | 0.2 | 1 | 30% | 70% | | | | | 4.9 |
| 225 | Asset123 | 7 | 1 | 1 | 30% | 70% | | | | | 4.9 |
| 35 | Asset2033 | 10 | 0.2 | 0 | 40% | 0% | 0.8 | 1 | 40% | 60% | 0 |
| 437 | Asset2033 | 10 | 0.1 | 0 | 40% | 0% | 0.4 | 1 | 40% | 60% | 0 |
| 819 | Asset2033 | 10 | 0.7 | 1 | 40% | 60% | 0.1 | 0 | 40% | 0% | 0 |
| 43 | Asset2033 | 10 | 1 | 1 | 40% | 60% | 0.3 | 1 | 40% | 60% | 3.6 |
| 58 | Asset2033 | 10 | 0.4 | 0 | 40% | 0% | 0.9 | 1 | 40% | 60% | 0 |
| 926 | Asset2033 | 10 | 0.3 | 0 | 40% | 0% | 0.6 | 1 | 40% | 60% | 0 |
| 208 | Asset2033 | 10 | 0.9 | 1 | 40% | 60% | 0.2 | 0 | 40% | 0% | 0 |
| 482 | Asset2033 | 10 | 0.5 | 0 | 40% | 0% | 0.7 | 1 | 40% | 60% | 0 |
| 226 | Asset2033 | 10 | 0.6 | 1 | 40% | 60% | 0.5 | 1 | 40% | 60% | 3.6 |
| 975 | Asset2033 | 10 | 0.8 | 1 | 40% | 60% | 1 | 1 | 40% | 60% | 3.6 |

| Mitigation type / Threat type | M_1 | M_2 | M_3 | M_4 | M_5 | M_6 | M_7 | M_8 | M_9 | M_10 |
|---|---|---|---|---|---|---|---|---|---|---|
| Threat 1 | 0 | 0 | 0 | 0.95 | 0.4 | 0.9 | 0.8 | 0.8 | 0.1 | 0 |
| Threat 2 | 0 | 0 | 0 | 0.95 | 0.2 | 0.8 | 0.7 | 0.9 | 0 | 0 |
| Threat 3 | 0 | 0 | 0 | 0.95 | 0.2 | 0.75 | 0.8 | 0.75 | 0.5 | 0 |
| Threat 4 | 0 | 0 | 0 | 0.8 | 0 | 0.75 | 0.5 | 0.75 | 0 | 0 |
| Threat 5 | 0 | 0 | 0 | 0.5 | 0 | 0.1 | 0.1 | 0.1 | 0 | 0 |
| Threat 6 | 0 | 0 | 0 | 0 | 0 | 0 | 0 | 0 | 0 | 0 |
| Threat 7 | 0 | 0 | 0 | 0 | 0 | 0 | 0 | 0 | 0 | 0 |
| Threat 8 | 0 | 0 | 0 | 0 | 0 | 0 | 0 | 0 | 0 | 0 |
| Threat 9 | 0 | 0 | 0 | 0 | 0 | 0 | 0 | 0 | 0 | 0.1 |
| Earthquake 1 | 0 | 0 | 0 | 0 | 0 | 0 | 0 | 0 | 0 | 0 |
| Earthquake 2 | 0 | 0 | 0 | 0 | 0 | 0 | 0 | 0 | 0 | 0 |
| Earthquake 3 | 0 | 0 | 0 | 0 | 0 | 0 | 0 | 0 | 0 | 0 |
| Earthquake 4 | 0 | 0 | 0 | 0 | 0 | 0 | 0 | 0 | 0 | 0 |
| Earthquake 5 | 0 | 0 | 0 | 0 | 0 | 0 | 0 | 0 | 0 | 0 |
| Earthquake 6 | 0 | 0 | 0 | 0 | 0 | 0 | 0 | 0 | 0 | 0 |

CODE START

LOF_reduction_by_mtg Definition:

Table( Threat_type_fixed, Mitigation_type_fixd )( { data } )

LOF_reduction_per_ev Definition:

Local threat_type := Failures_per_event_a[ Event_ID = Events_to_be_mitigat, Failure_categories = 'Event' ];
LOF_reduction_by_mtg[ Mitigation_type_fixd = Mitigation_map, Threat_type_fixed = threat_type ] * Asset_data_csv[.Row = Failures_per_event_a[ Event_ID = Events_to_be_mitigat, Failure_categories = 'Asset row' ], Asset_col = Mitigation_map, defVal: 1 ]
Event_Values Definition:
Round( LOF_reduction_per_ev * Failures_per_event_a[Event_ID = Events_to_be_mitigat, Failure_categories = 'Value'] )
Terminal_failure_ID Definition:
Cumulate( Failures_per_event_a[ Failure_categories = 'Value'], Event_ID
)[Event_ID=Events_to_be_mitigat]
LoF Definition:
(NOT Sum(
Failure_ID_candidate > (Terminal_failure_ID - Event_Values) AND
Failure_ID_candidate <= Terminal_failure_ID,
Events_to_be_mitigat ))[Failure_ID_candidate = Failure_ID, defVal: 1]
CoF Definition:
SetContains( \Selected_assets_rows, Asset_row_for_failur ) * COF_reduction
Mitigation_Vector Definition:
LOF * (1-CoF)
Effective_Impact Definition:
Mitigation_Vector * Impact_per_failure

CODE END

*Fig. 21*

AGGREGATING SPARSE NON-CONGRUENT SIMULATION TRIALS

PRIORITY CLAIM AND INCORPORATION BY REFERENCE OF RELATED APPLICATIONS

This application claims priority to U.S. Application No. 62/687,690 filed Jun. 20, 2018 and U.S. Application No. 62/831,105 filed Apr. 8, 2019, each of which is incorporated by reference as if fully set forth herein. This application also incorporates by reference in its entirety as if fully set forth herein U.S. patent application Ser. No. 15/494,431, titled "Sparse and Non Congruent Stochastic Roll-up," filed Apr. 21, 2017.

COPYRIGHT NOTICE

This disclosure is protected under United States and/or International Copyright Laws. © 2018 and 2019 AnalyCorp. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Stochastic simulation is the imitation of random processes used to gain insight into the behavior or distribution of outcomes of the processes. The Monte Carlo method of simulation uses repeated random sampling to give numerical results. Monte Carlo is frequently used when analytical solutions would be too difficult, too time consuming, or impossible, to compute. Simulation is often used to estimate, for example, the risks or rewards (henceforth referred to as "outcomes") facing an organization along multiple dimensions, including for example, of finance, safety, reliability and so on. However, when large numbers of simulations involving large numbers of calculations are performed, current methods present various shortcomings, including requiring too many processing resources, taking too much time to perform the calculations, etc. In addition, current techniques do not allow for combining variables having different probabilities without performing an enormous amount of trials in a simulation, and do not allow for real time adjustments that provide real time outputs. Accordingly, improvements can be made to current stochastic simulation techniques.

BRIEF DESCRIPTION OF THE DRAWINGS

Preferred and alternative examples of the present disclosure are described in detail below with reference to the following drawings:

FIGS. 2A-2G illustrate example simulation tables corresponding to the process described in reference to FIG. 1.

FIGS. 4A-4B illustrate example simulation tables corresponding to the process described in reference to FIG. 3.

FIGS. 5A-5I illustrate example simulation tables modeling different mitigation strategies for reducing the likelihood of failure and/or impact of one or more components in a physical system according to an embodiment.

FIGS. 7A-7C illustrate example simulation tables corresponding to the process described in reference to FIG. 6.

FIGS. 8A-B illustrate an example weighted Stochastic Information Packet (SIP) representation of mitigation modeling, according to the techniques described in FIGS. 1-7.

FIGS. 9A-C illustrate another example SIP representation of mitigation modeling, according to the techniques described in FIGS. 1-7.

FIG. 11A shows the input specifications for a technique of simulating multiple mitigations that can simultaneously reduce both LoF and CoF risks over multiple assets according to an embodiment.

FIG. 11B demonstrates the steps in the technique of simulating multiple mitigations that can simultaneously reduce both LoF and CoF risks over multiple assets according to an embodiment.

Figure 12A:
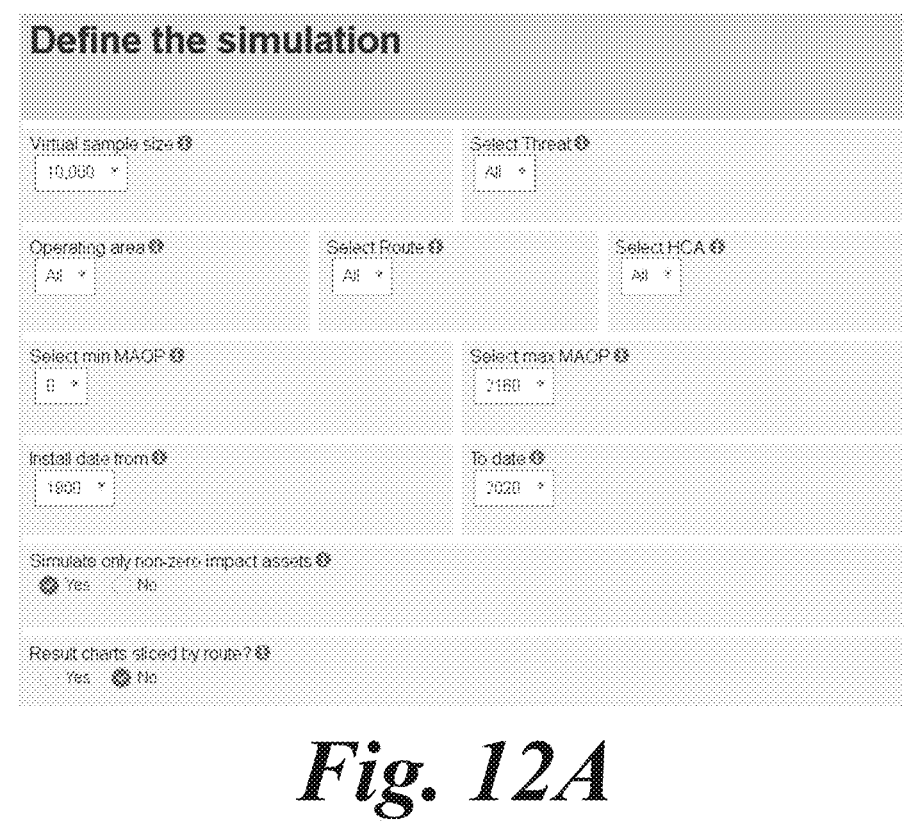

FIG. 12A shows a simulation setup panel using sparse non-congruent simulation in a commercially used application to model pipeline safety risk according to an embodiment.

FIG. 12B shows a different configuration of the simulation setup panel shown in FIG. 12A.

FIG. 13 depicts the input specifications of a set of gas pipe safety mitigation projects in a commercially used application following the approach of FIG. 11A.

FIG. 16 shows a graphical display of a dynamic risk ranking in a commercially used application according to an embodiment.

FIG. 20 depicts the effective mitigation in a commercially used application, analogous to the last column of FIG. 11B.

FIG. 21 is a sample of code from a commercial application that uses sparse non-congruent simulation according to an embodiment.

DETAILED DESCRIPTION

Sparse Simulation

Figure 1:
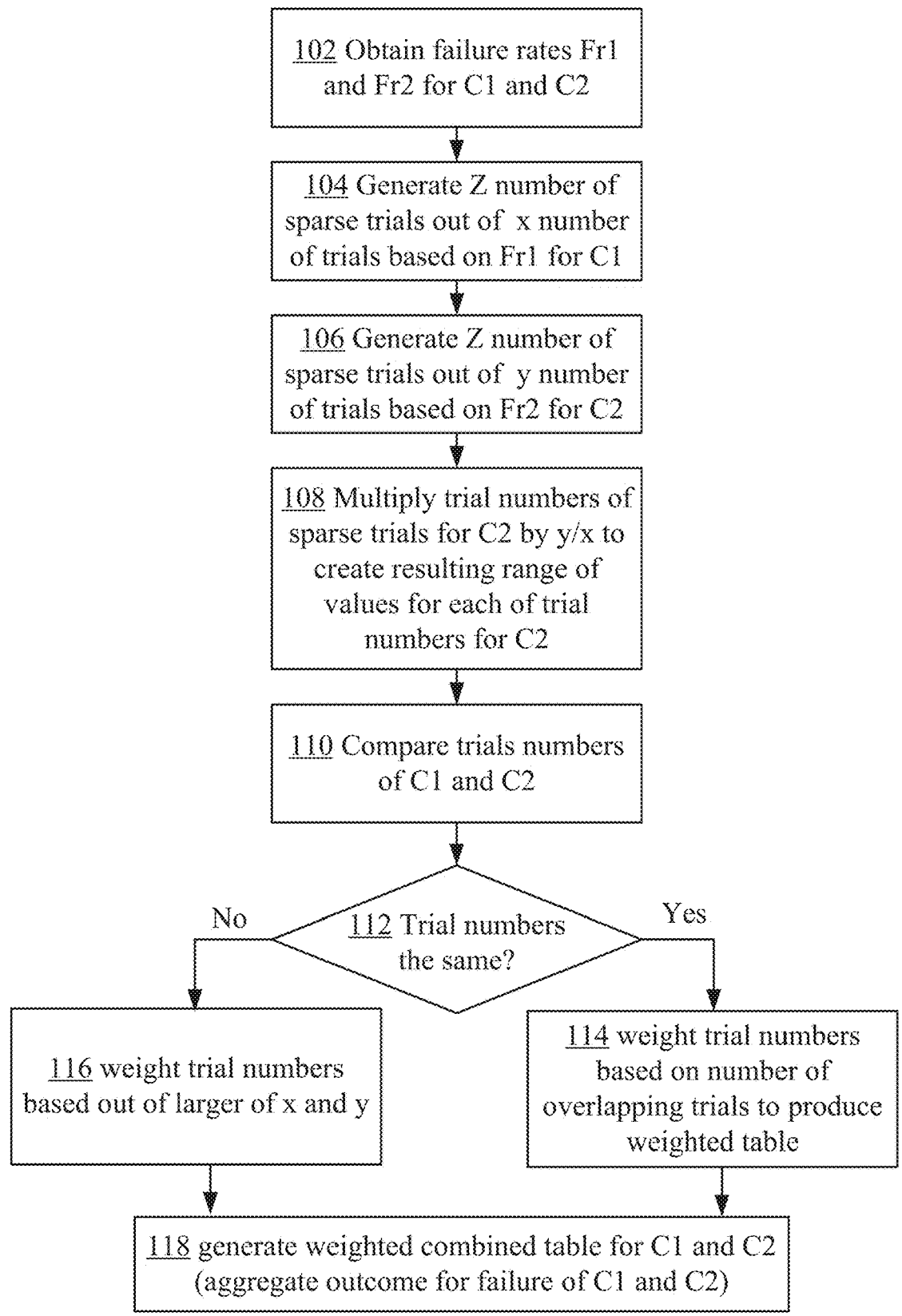
FIG. 1 illustrates a flow chart of an example process for aggregating different likelihood of failures (LoF's) two different components in a physical system according to an embodiment.

When creating stochastic libraries of rare events according to the discipline of probability management, it is useful to store only those simulation trials on which an event actually takes place, as described in my related U.S. patent application Ser. No. 15/494,431, titled "Sparse and Non Congruent Stochastic Roll-up," filed Apr. 21, 2017, incorporated by reference herein. Suppose for example, a mechanical component is known to have a likelihood of failure (LoF) of one in 100,000 hours of operation, with an associated uncertain damage as a consequence of failure (CoF). To measure the variation in uncertain damage, suppose it is considered adequate to observe ten failures. Thus, to observe ten failures would require 1 million simulation trials (100,000×10), each representing one hour of operation. If a system had 1,000 such components, 1 billion simulation trials would be required to cover them all (1 million trials×1000 components). 1 billion trials, even with modern computing power, would require an impractical and unwieldy amount of time and resources. However, using sparse simulation, the 1 billion numbers (representing trials) would be reduced to merely 20,000 numbers as follows.

For each component, 10 random integers would be generated between 1 and 1 million, each such integer (of those 10) to denote the trial number in the simulation on which a failure of that component would be considered to have occurred.

Similarly, for each of those 10 trial integers or numbers, a damage consequence would also be generated. For example, FIG. 2A displays typical results for component 1. Column 2 indicates the trial on which the component failed, while Column 3 indicates the damage as a consequence of that failure. The fact that there are 10 rows in the table indicates that the LoF of component 1 is 10 per 1 million hours or 1 per 100,000 hours. Column 3 provides an indication of the variability of the CoF, or consequential damage of a failure. The 20 numbers in columns 1 and 2 are known as sparse trials and have replaced a column of 1 million standard Monte Carlo trials, most of which would have been zero. For each of the 1,000 components, the 20 associated numbers would be stored in a stochastic library, for a total of 20,000 numbers. Considerable computation time might be required to generate the data in the stochastic library, but once created, the resulting simulations may easily be aggregated in numerous ways, such as, for example, the distribution of total damage over any subset of assets or components.

Non-Congruent or Weighted Simulation

Now suppose there are two components with very different failure rates. FIG. 1 illustrates an exemplary process for aggregating simulations of variables with different probabilities of occurrence (different failure rates or likelihood of failure, LoF). At operation 102, failure rates Fr1 and Fr2 for components C1 and C2 may be obtained, where Fr1 and Fr2 are different from each other. For example, component 1 (C1) may be expected to fail every 100,000 hours, and component 2 (C2) may be expected to fail every 100 hours. To simulate an average of 10 failures of each component, 1 million trials would need to be performed for component 1, but only 1,000 trials for component 2. In general it would not be possible to aggregate the results of two simulations with different numbers of trials. However, as described below, the present disclosure addresses this problem and provides methods for simulating and aggregating variables having different probabilities of failure (or other metrics).

In one example, ten sparse trials of the kind described above may be generated for component 1 based on 1 million trials (x), and ten sparse trials are generated for component 2 based on a thousand trials (y), at operations 104 and 106, respectively. The resulting arrays of trial numbers and failure damage might appear as illustrated in FIGS. 2A and 2B, respectively. For example, we know that component 1 will fail 10 times in 1 million hours so 10 random number integers between 1 and 1 million are generated to indicate or denote the trials on which component 1 will fail as shown in column 2 of FIG. 2A. For each of these failures we simulated the consequent damage of failure of component 1 as shown in column 3 of FIG. 2A. Similarly, we know that component 2 will fail 10 times in 1 thousand hours so 10 random number integers between 1 and 1 thousand are generated to indicate or denote the trials on which component 2 will fail as shown in column 2 of FIG. 2B. For each of these failures we simulated the consequent damage of failure of component 1 as shown in column 3 of FIG. 2B.

Next, at operation 108, the trial numbers of component 2 may be multiplied by 1,000, and each trial may be replaced by 1,000 contiguous trials, to create a data set, as illustrated in FIG. 2C, that may be aggregated with component 1. Operation 108 may be generalized, for example, assuming that x>y (e.g., Fr1<Fr2), by multiplying the trial numbers of sparse trials for C2 by x/y to create a resulting range of values for each of the trial numbers of the sparse simulations for C2.

Next, the trial numbers for the sparse simulations for C1 and C2 may be compared, at operation 110. If any trials from component 1 intersect with the 1,000 trial blocks of component 2 at operation 112, they may be flagged. These are trials on which both components fail together. For example, as illustrated and indicated in FIG. 2D, entry 3 for C1 and entry 4 for C2 overlap. The results of the overlap are illustrated in FIG. 2E, where the 1 in the right most column indicates the overlap.

The flagged intersecting trials may be singled out and weighted based on the number of overlapping trials numbers at operation 114, while the remaining trials may be given weights corresponding to the number of millionths (x), at operation 116. This is illustrated in FIG. 2F.

Finally, the table for component 2 is replaced by a weighted table illustrated in FIG. 2G, in which a fourth column has been added indicating the weight of each trial in millionths. Next the table of FIG. 2A is augmented to add a fourth column of weights appended on the right, all of whose elements are 1, representing 1 millionth. The augmented table of FIG. 2A and FIG. 2G may now be simply appended into a single table of four columns to create a sparse simulation that aggregates the results of both component 1 and component 2, at operation 118. For example, if the first table contained rare earthquake risks, and the second contained more common wildfire risks, then by appending one table to the other in either order, one would create a database of weighted sparse trials that would model both earthquakes and wildfires. Now, at this point in the process, all probabilistic calculations include a fourth column of weights, as described in my U.S. patent application Ser. No. 15/494,431.

Dynamic Adjustment of Likelihood of Rare Events

Figure 3:
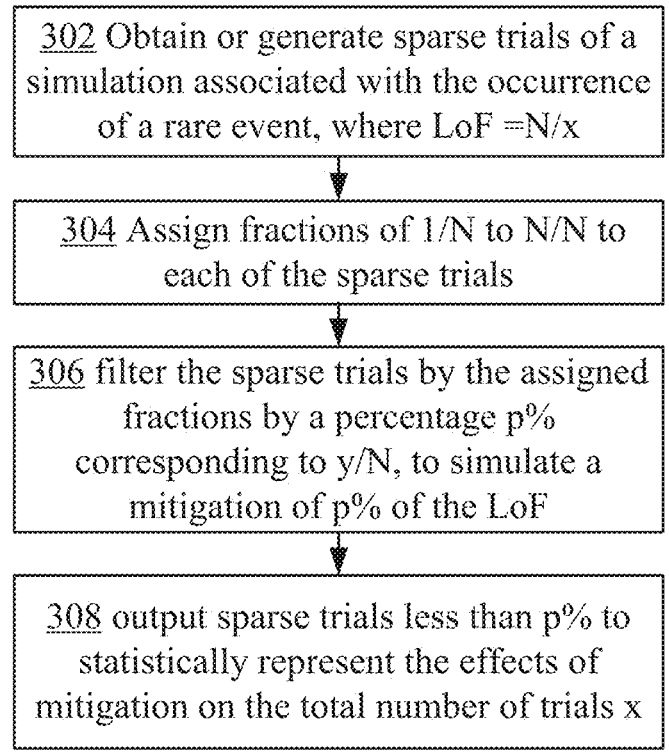
FIG. 3 illustrates a flow chart of an example process for modeling different mitigation techniques on a set of trials of a simulation of a physical system according to an embodiment.

In some aspects, the likelihood of rare events occurring can be modeled and changed in real time, for example, to model the impacts of certain mitigation strategies. This may be performed without generating the entire set of sparse trials over again. Instead, fast database selection procedures may be performed on the existing data via the following techniques, thus saving significant resources and providing real-time or near real time results. FIG. 3 illustrates an exemplary process for modeling different mitigation techniques on a set of trials of a simulation. This process will be described in reference to the tables illustrated in FIGS. 4A-B. In general, such a table of components, trial numbers, and modifications to likelihood or consequence of failure may be referred to as a mitigation vector.

Process 300 may begin at operation 302, where a number of sparse trials associated with the occurrence of a rare event may be generated or obtained. In the following example, x represents the nominal number of trials, for example 1 million in FIG. 2A. N represents the number of failures out of x trials, or 10 in FIG. 2A. The occurrence of the rare event may be represented by a likelihood of failure (LoF), represented by N/x, with x representing the total number of trials. Next, fractions from 1/N to N/N may be assigned to each of the sparse trials, randomly or in order (it doesn't matter as the trial numbers are generated at random out of x). The number of fractions will correspond to the number of trials represented, as each numerator will increment by 1 until N is reached. As illustrated in FIG. 4A, N=9, so the fractions range from 1/9 to 9/9 or 1.

Next, at operation 306, the sparse trials may be filtered by the fractions. The filter may equal a percentage ("p %") corresponding to y/N, to simulate a mitigation of p % of the LoF. For example, suppose we wanted to simulate a mitigation that reduced the LoF by 33%. To accomplish this, the rows of the table in FIG. 4A would be filtered to remove up to the value 3/9, as illustrated in the modified table of FIG. 4B. Because the trial numbers were assigned or picked at random, this way of modeling a reduction in LoF maintains congruency of the data and simulation. It should be appreciated that the same calculation could be performed by taking 100%−33%=66% and then keeping trials greater than the calculated percentage value (e.g., keeping anything up to 6/9). In either case the number of occurrences of failure in the simulation has been reduced by 33%. Next, at operation 308, the sparse trials satisfying the percentage filter may be output to statistically represent the effects of mitigation on the total number of trials. This process allows the user to statistically evaluate the degree of risk reduction, as in FIG. 14.

The above mitigation would allow the user to specify a percentage reduction in LoF, and then quickly query the database of sparse trials to simulate the results without recomputing the full database. FIGS. 5A-5F represents other ways to model different mitigation techniques on a set of trials of a simulation.

FIG. 5A represents a way to model a fixed LoF mitigation strategy, on a set of trials representing assets 1, 2, and 3. As illustrated, a 1 or a 0 may be assigned to the trials for each asset to represent the mitigation strategy, where the proportion of 1's represents the percentage of LoF mitigation, that is, the number of 1's=% A*T(A) where % A is the percentage LoF for asset A and T(A) is the number of sparse trials for asset A. For example, 2/4 trials for asset 1 are assigned 1's to represent a 50% mitigation strategy. No 1's are assigned to asset 2 to represent no mitigation strategy, and 4/6 trials for asset 3 are assigned 1's to represent a 66.7% mitigation strategy. The 1's and 0's are assigned during the generation of the sparse trials database. Thereafter a user may observe the statistical results of the mitigation strategy by quickly filtering out the rows with 1's for each asset.

FIG. 5B illustrates an example technique for modeling a variable LoF mitigation strategy, on a set of trials representing assets 1, 2, and 3. In the example illustrated, the mitigation strategy reduces the LoF for assets 1 and 3. A number may be generated and added to each trial number in the Mitigation Column for each asset (A), with the assigned numbers running from 1 to 1/T(A) in increments of 1/T(A), where T(A) is the number of trials for asset A. The order of the trials (rows) is then permuted to create the randomization required for simulation. To invoke a residual LoF of p % across all assets affected by the mitigation, numbers greater than p % may be filtered out, removing those failure events prevented by the mitigation. The remaining trials represent the residual risk after application of the modeled mitigation strategy.

FIG. 5C illustrates an example technique for modeling a fixed impact mitigation strategy using full data replication on a set of trials representing assets 1, 2, and 3. That is, the impact from the CoF is reduced instead of the LoF. In the example illustrated, the mitigation to be modeled reduces the impact or consequence of failure of asset 2 from 20 to 12. Multiple different mitigations can be modeled for different assets, with each additional mitigation requiring the addition of another column to the data and an additional copy of the entire data set as shown in FIG. 5C. This type of mitigation modeling may be implemented by first creating a mitigation column (M) and adding it to a data set of simulation trials. Next, the entire data set may be duplicated, and stored in memory, for example. The mitigation column in the original data set (top of the table in FIG. 5C) may be set to 0, to represent no mitigation. In the duplicated data set (bottom of table in FIG. 5C), the mitigation column may be set to a 1 and the impact reduced from 20 to 12 for asset 2. This mitigation has no impact on assets 1 and 3, so these impacts do not change in the second copy of the database. Next, to model no mitigation, the entire table may be filtered for M=0 (keeping rows that have a M=0 value), whereas to model the mitigation, the entire table may be filtered for M=1 (keeping rows that have a M=1 value). In this way, the model of the system may easily be changed to represent the application of a given mitigation strategy.

FIG. 5D illustrates an example technique for modeling a fixed impact mitigation strategy using partial data replication on a set of trials representing assets 1, 2, and 3. In the example illustrated, mitigation M1 to be modeled reduces the impact or consequence of failure of asset 2 from 20 to 12, and mitigation M2 reduces the impact or consequence of failure of asset 1 from 10 to 7 and asset 3 from 15 to 8. Multiple different mitigations can be modeled for different assets, with each additional mitigation requiring the addition of another column to the data and an additional copy of the affected parts of the data set. In this example, two columns are added, one to model the application of M1 and the second to model the application of M2. Each trial may be coded or given a value in the corresponding columns Imp_M1 and Imp_M2 based on the desired modeling relationships and interdependencies. The upper table represents the original data set, and the lower table represents the modified data set. In this example, all the assets are affected, so the whole data set is reproduced. However, in the partial replication method, only the rows corresponding to the assets affected need to be reproduced. In the example illustrated, 0 is assigned to trials of unmitigated assets. For M1, this includes assets 1 and 3, and for M2, this includes asset 2. 1 is assigned to the unmitigated state of a mitigated asset. 2 is assigned to the mitigated state of a mitigated asset. Using this process, a number of different searches of filters may be applied to narrow the results to all mitigated assets for M1, M2, or both, depending on which number is selected and to which column the filter is applied.

FIG. 5E illustrates an example technique for modeling multi-level or multi-impact mitigation strategies using partial data replication on a set of trials representing assets 1, 2, and 3. In the example illustrated, mitigation M1 to be modeled reduces the impact or consequence of failure of asset 2 from either 20 to 12, or from 20 to 8. The modeling conventions are the same as described in relation to FIG. 5D, unless otherwise noted. Here the coding scheme for column Imp_M1 is slightly different. 0 represents unmitigated assets, 1 represents the unmitigated state of a mitigated asset, 2 represents the 1st mitigated state of a mitigated asset, and 3 represents the second mitigated state of a mitigated asset. Using this convention, 0+1 may filter for unmitigated assets, 0+2 may filter for the first level of mitigation, and 0+3 may filter for the second level of mitigation.

FIG. 5F illustrates an example technique for modeling multiple mitigation strategies including impact mitigation and LoF mitigation on a set of trials representing assets 1, 2, and 3. Table 1 below, which depicts a possible input format to specify the construction of a table such as that in FIG. 5F, details the different types of mitigation applied to each asset. For example, the 80% in column 4 indicates an 80% residual impact risk for asset 2 after application of the mitigation. Any of the LoF M1, Imp_M2, and/or Imp_M3 may be filtered to achieve modeling different combinations of mitigation strategies.

TABLE 1

| Asset ID | LoF | LoF M1 | Impact | Imp M |
|---|---|---|---|---|
| 1 | 4/M | 50% | 10 | |
| 2 | 3/M | | 20 | 80% |
| 3 | 6/M | | 15 | 50% |

FIG. 5G illustrates an example set of sparse trials produced by a technique for modeling multiple mitigation strategies including impact mitigation, multiple levels of impact mitigation on a single asset, and LoF mitigation (e.g., combining the mitigations described above in reference to FIGS. 5E and 5F) on a set of trials representing assets 1, 2, and 3. To view the results of various mitigations, this table is filtered on the associated column.

FIG. 5H illustrates a set of sparse trials from an example technique for modeling multiple mitigation strategies including (indicated by a 1 or 2 in column Mitigation Project for different assets combined with LoF mitigation on a number of different assets. As illustrated in FIG. 5H, the mitigation strategy may be filtered via a 1 or a 2, and/or LoF may be filtered by selecting a threshold between 0 and 1, as furthered described above in reference to FIG. 5B.

FIG. 5I illustrates an example technique for modeling multiple impact mitigation strategies that each have different impacts on different assets. Instead of filtering the sparse trials database, an adjusted CoF (column 6) is substituted for the original CoF (column 3) when the associated mitigation is invoked. As illustrated in FIG. 5I, mitigation M1 (80% reduction in consequence of failure or "CoF") is applied to asset 1, in that CoF is reduced from 20 to 4. Mitigation M2 is applied to asset 2 (100% reduction in CoF, from 30 to 0), and mitigation M1 (100% reduction in CoF) is applied to asset 3. In this example three additional columns are created for each trial in the simulation.

In some aspects, each of the techniques described above with respect to FIGS. 5C-5I can be accomplished by adding one or more additional values (e.g., one or more columns to the table of values) to each row/simulation trial, to model dynamic impact mitigation. This may drastically reduce the amount of data stored to model one or multiple different impact mitigations, by adding new values to each row or record without having to duplicate each row or record and then associate a different impact value to it. This may be facilitated using various other existing or developing software platforms, such as Analytica by Lumina, to implement the described techniques more easily and efficiently.

Figure 6:
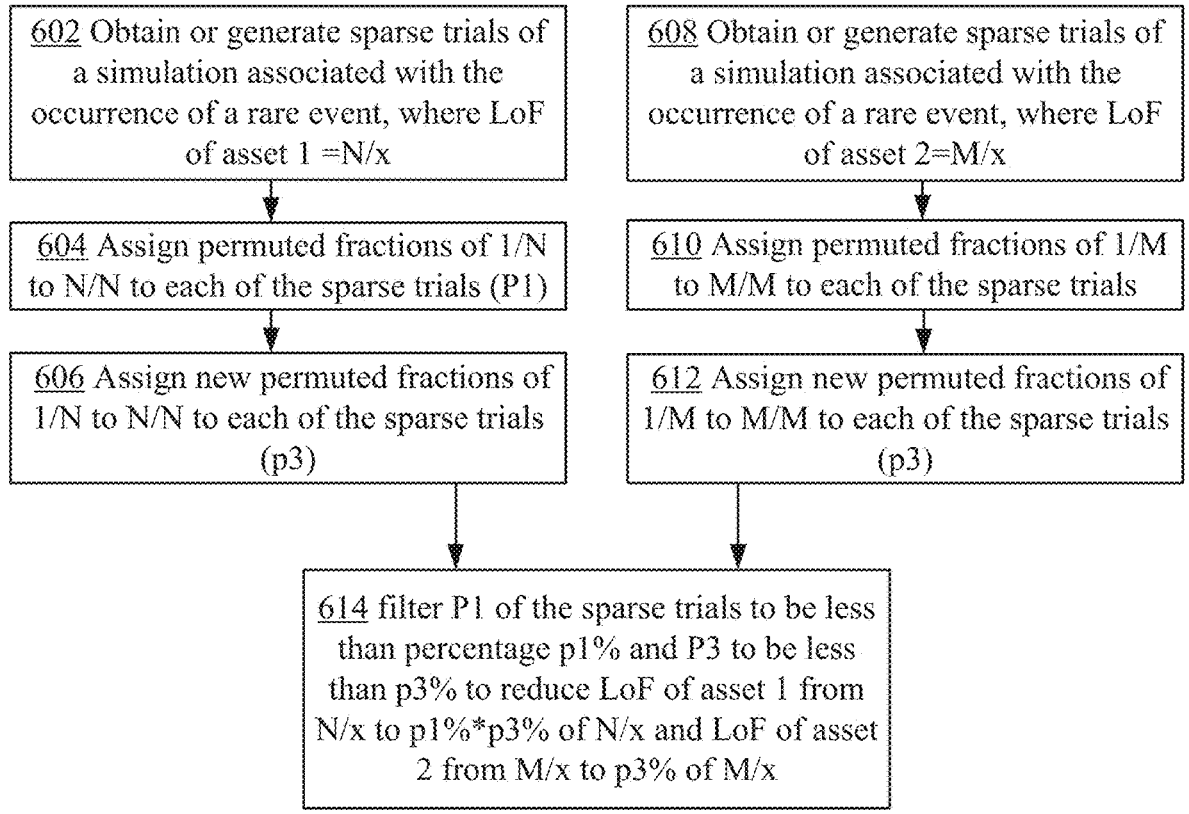
FIG. 6 illustrates a flow chart of another example process for modeling different mitigation techniques on a set of trials of a simulation of a physical system according to an embodiment.

Another process 600 for modeling mitigation on a number of assets in a simulation is illustrated in FIG. 6, which will be described below in reference to the table illustrated in FIG. 7A. This example models the sequential application of two LoF mitigations in which the risk reduction is multiplicative. In the example illustrated, it is assumed that the simulation includes 1 million trials (variable x) with rare events. Asset 1 LoF is N/1 Million (obtained at operation 602), Asset 2 LoF is M/1 Million (obtained at operation 608). Column P1, of FIG. 7A, applies only to N rows of asset 1 data. It consists of the fractions 1/N through N/N permuted in random order (operation 604) and will be used to filter out rows in the sparse database according to the LoF percentage reduction input by the user. Similarly, column P2 applies only to M rows of asset 2 data. It consists of the fractions 1/M through M/M permuted in random order (operation 610). Column P1 applies to Mitigation 1, applying to asset 1 and P2 corresponds to mitigation 2, applying to asset 2. Column P3, Mitigation 3, applies to both asset 1 and asset 2. It consists of the fractions 1/N through N/N permuted in a new random order (operation 606), and the fractions 1/M through M/M permuted in another random order (operation 612). Specifying the three percentage LoF reductions and then filtering on the associated P columns models in any combination of the three mitigations, and results in a multiplicative reduction in LoF.

Filtering column P1 to be less than p1% effectively reduces the LoF of Asset 1 from N/1 Million to p % of N/1 Million. Filtering column P2 to be less than p2% effectively reduces the LoF of Asset 2 from M/1 Million to p2% of M/1 Million. These results follow process 300 described above in reference to FIG. 3.

In one example, for asset 1, N=100, and p %=75%, meaning that there is a LoF of 100/1 Million, and a mitigation strategy may reduce that LoF to 75%, mitigating 25% of the negative consequence of failure. FIG. 7B illustrates a table that reflects asset 1 from the table of FIG. 7A, with N=100. Applying the mitigation technique yields the table illustrated in FIG. 7C. As a result, in the illustrated portion of the table of FIG. 7C (to be complete, the table would include 100 rows), 3 rows were eliminated.

Because the values of P1 were assigned at random, the resulting filtering is also random, thus producing a viable and accurate sample of the LoF of asset1 after 25% of the failures have been mitigated, for example, by one or more mitigation strategies. It should be appreciated that the type of mitigation strategy, the consequence, and even LoF metrics may be set according to any possible situation desired to be simulated. One key benefit of this technique is the ability (in real-time or near real time) to simulate different mitigation techniques and their effect on a large simulation. This benefit is realized through the combination of using sparse notation, as described in U.S. patent application Ser. No. 15/494,431, and utilizing permutation to assign each relevant simulation trial a value corresponding to an equal fraction of the total number of significant trials. By performing these operations and adding the additional value to the each simulation trial of significance, the resulting modified simulations trials may be filtered or selected according to the additional value added, to simulate the effects of mitigation on the entire simulation. Because sparse notation is used, coherence between all of the trials of the simulation (e.g., 1 million trials), may be maintained. This is because any trial that is effectively mitigated then returns to the insignificant group of trials, meaning that each trial is still accounted for.

It should be appreciated that the above described techniques may be alternatively used to increase the probability of an event happening, as opposed to reducing a likelihood of failure. It should also be appreciated that each asset in the above example may be treated individually, such that each is independent of the other. As also illustrated and described in the above example, although the likelihood of the failure has been changed, the consequence of an event (e.g., number of people without power as a result of the failure of a transformer in a power utility), is not changed. In other examples, the consequences could be changed, and the LoF held constant. In yet other examples, both the consequences and LoF could be changed.

Returning to process 600, column P3 of the table of FIG. 7A applies to both asset 1 and asset 2. It consists of the fractions 1/N through N/N permuted in a new random order (operation 606), and the fractions 1/M through M/M permuted in another random order (operation 610). Filtering column P1 to be less than p1% and P3 to be less than p3% effectively reduces the LoF of Asset 1 from N/1 Million to p1%*p3% of N/1 Million, and reduces the LoF of Asset 2 from M/1 Million to p3% of M/1 Million (operation 614).

It should be appreciated that the above-described techniques can be performed with multiple mitigations overlapping as in the case of P1 and P3 above, in which case it is assumed that the two mitigations have independent effects. In some aspects, there may be potential issues with interdependence in mitigations. For example, by perfectly correlating the random fractions for Asset 1 in columns P1 and P3, we would model two mitigations for which there would be no benefit in applying either, once the other had been applied. On the other hand, if the random fractions for Asset 1 in columns P1 and P3 were perfectly anti-correlated, then we would model mitigations that worked synergistically so that the effect of applying them together would be greater than the sum of the effects of applying them separately. Partial correlation of the columns would model mitigations with varying degrees of interaction. In some aspects, Cholesky factorization may be used for partial correlation of mitigation columns to adjust overlap between two different types of mitigation techniques. In some aspects, the described techniques may enable a forensic approach to modeling and ultimately selecting mitigation strategies in that certain relationships may be ascertained based on gathered data by reviewing histories through the system to gain or discern these relationships. These relationships can then be used to inform and adapt future simulations.

In addition, different mitigation techniques with different mitigation results (e.g., different percentages of mitigation) may be simulated together on the same set of data/trials using a modification of the above described technique.

Figure 8B:
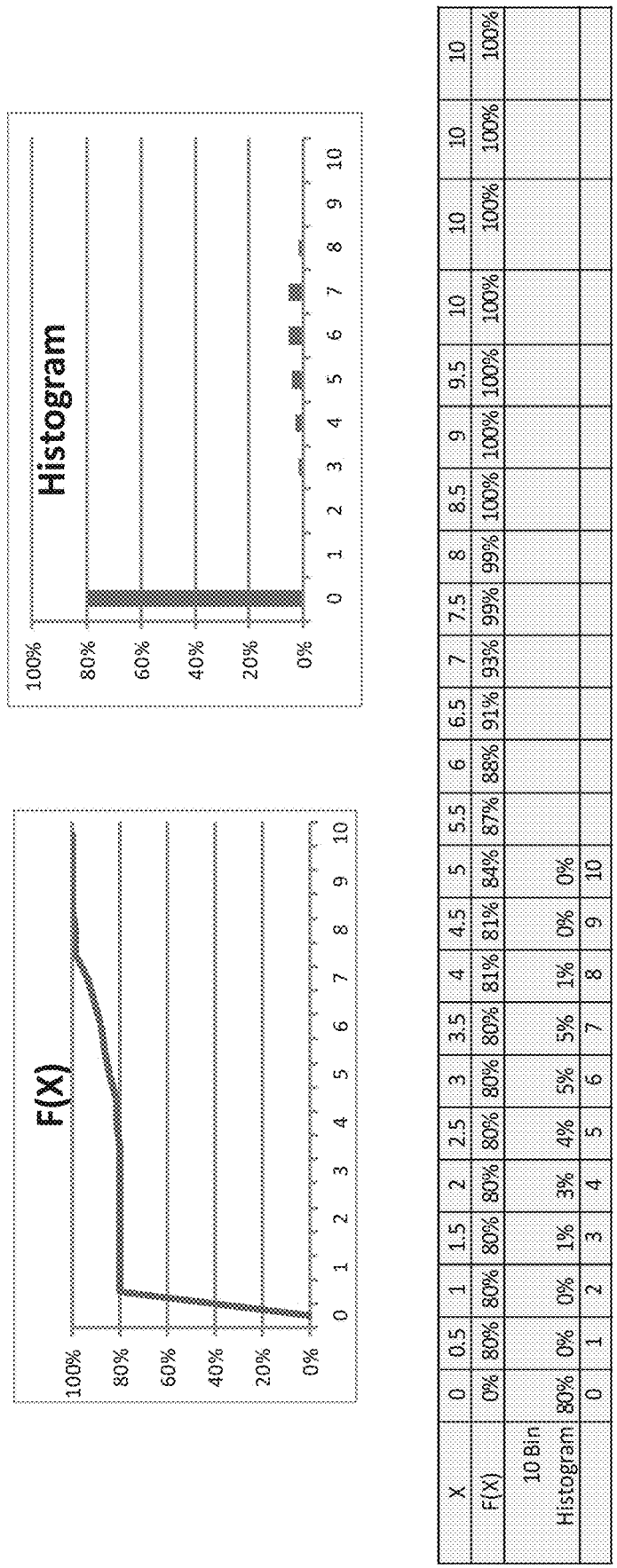

Some of the techniques described above result in sets of weighted Monte Carlo trials. Note, a set of stored Monte Carlo trials is known as a Stochastic Information Packet (SIP). FIGS. 8A-B illustrate how standard statistics may be derived from a complete set of weighted SIPs generated according to the techniques described above. As illustrated, the probability of occurrence of event (A) is 20%. Thus, the weighted SIP is assigned an 80% probability of the value zero, which is to say event A does not occur. The SIP has 15 trials where an event occurs, so each has a weight of 20%/15=1.33%. Using these weights, standard statistical properties can easily be derived according to standard statistical formulas, as illustrated in FIG. 8B. The mean for the SIP is the sum of the weights times the corresponding values. Similarly, the standard deviation (sigma) is found as follows. For each trial, square the value minus the mean of the SIP, and multiply by the weight associated with that trial. The sum of these quantities is the variance for the entire SIP, and taking the square root of the variance yields the standard deviation. The probability that the value is less than x is found by summing the weights for which the associated values are less than x. Doing this for an array of x values ranging from the minimum to the maximum, results in the cumulative distribution of x,F(X). Taking differences of F(X) values results in the histogram, as illustrated in FIG. 8B.

FIGS. 9A-C illustrates how weighted SIPs may be added to create aggregated simulations according to the techniques described above. As illustrated, events A and B are mutually exclusive. The probability of occurrence of event (A) is 20% modeled for 15 trials and the probability of occurrence of event (B) is 1% for 20 trials. The differing weights can be integrated into the same SIP by reducing the weight of the zero trial and adding the weight/trial pairs to the SIP accordingly. As in FIGS. 8A-B, the full range of statistics can be performed on these noncongruent SIPs. As described in FIG. 1, this approach may be extended to the case in which A and B are not mutually exclusive.

Figure 10:
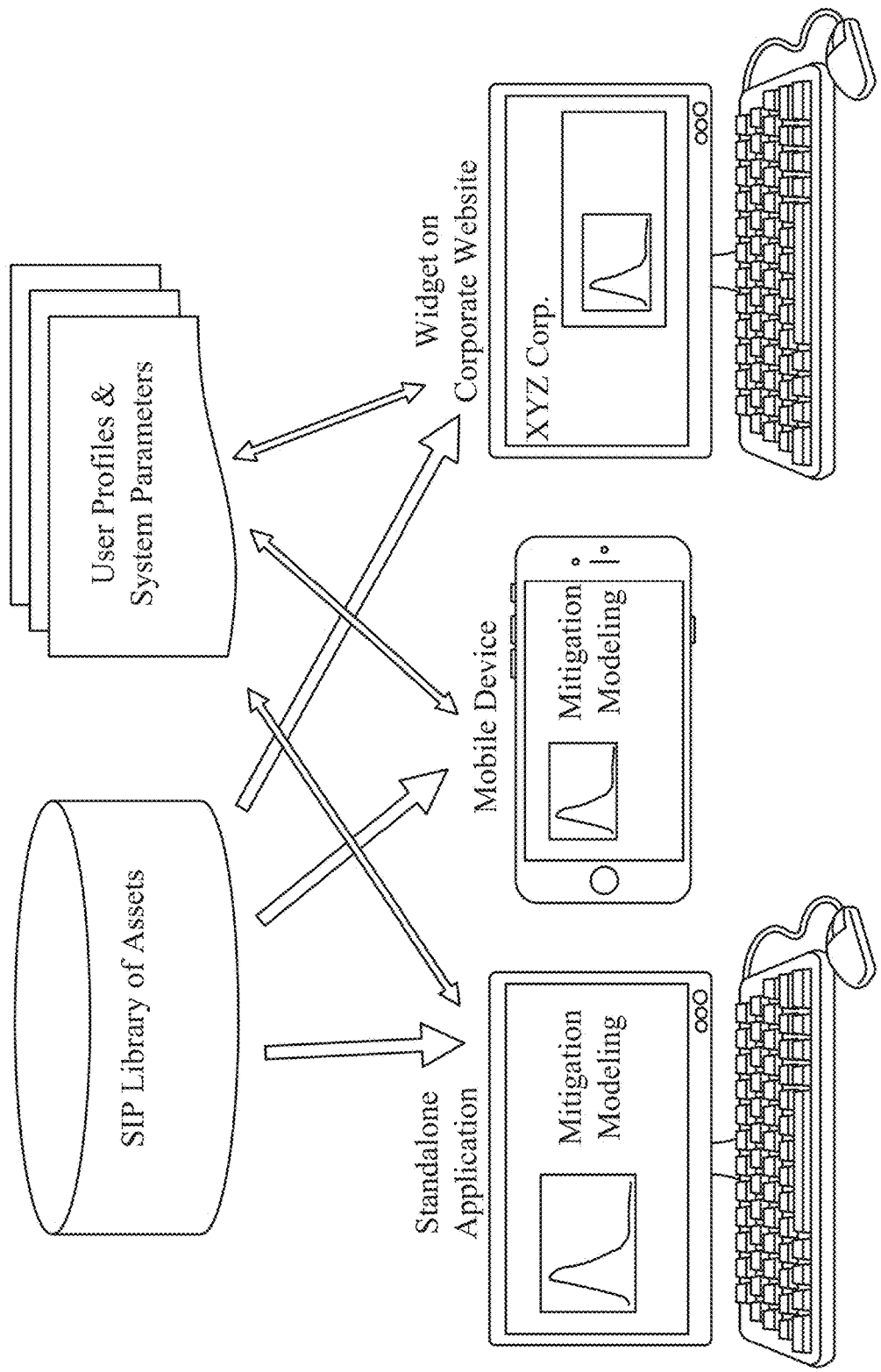
FIG. 10 illustrates an example system in which the techniques and representations described in reference to FIGS. 1-9 may be utilized.

FIG. 10 illustrates an example system 1000 for implementing the one or more of the above described techniques. System 1000 provides any of a number of interfaces, such as a web application (e.g., a widget installed on a web page), program on the user's computer, or other application running on any computing device, such as a tablet, laptop, mobile device, etc., for entering trial information, changing operational and mitigation parameters, and for displaying results for modeling mitigation. It should be understood that the described systems and methods may be implemented on any of a number of computing devices, which may interface with local or remote memory to store, access, and/or modify data, such as simulations, outcomes, and other information. In some aspects, the described techniques may be integrated into existing computational or modeling software programs, such as in Microsoft Excel®, using the built in Data Table. Furthermore the techniques may be expanded to encompass stochastic optimization by using the Excel Solver® or other optimization packages to implement methods described in "Holistic vs. Hole-istic Exploration and Production Strategies," Ben C. Ball & Sam L. Savage, Journal of Petroleum Technology, September 1999, the contents of which are herein incorporated by reference in their entirety. In another example, the described techniques may be integrated into Microsoft PowerPivot® or Power BI®. Large libraries of sparse SIPs can be stored within Microsoft Excel's data model. Using PowerPivot® or Power BI®, mitigation techniques may be applied and modeled on the sparse SIPs, and the results may be viewed both in terms of output statistics and graphs. Additionally or alternatively, mitigation modeling may be performed on sparse SIPs and represented and implemented in Excel® SIPmath models with full compatibility with the SIPmath modeler tools. Additionally, the described techniques can be performed algorithmically using any standard programming language.

An alternate and generally more efficient approach for mitigating both LoF and Cof is described in FIGS. 11A and 11B.

FIG. 11A lists the specification of two mitigations. Each mitigation may apply to multiple assets, and for each asset a reduction in both LoF and CoF may be specified. These specifications are converted through the technique described below to create a single sparse vector comprised of effective CoF values for some, or all, assets. The effective CoF will be zero, if LoF reduction has removed the corresponding trial, and will be the residual CoF after CoF reduction for those trials that remain. In the example shown, Mitigation 1 reduces the LoF and CoF of Asset 123 by 10% and 30% respectively. It also reduces the LoF and CoF of Asset 2033 by 20% and 40% respectively.

FIG. 11B displays the various steps of this technique. As in earlier examples we have a column for sparse trial number, asset and consequence of failure (CoF). Again, we have a column of permuted fractions for each mitigation, with the permuted fraction for Mitigation 1 in column 4 and the permuted fraction for Mitigation 2 in column 8. A LoF reduction column is generated for each mitigation (the first in column 5 and the second in column 9). A "1" in these columns indicates that the LoF of that mitigation is greater than the value in the associated Permuted Fractions column. This means that the sparse trial will not be removed by that mitigation, whereas a "0" indicates that it will be removed. For each mitigation there is a CoF reduction column (columns 6 and 10). The reader or person of ordinary skill in the art will see that these CoF reductions in that column correspond to the CoF specifications in FIG. 11A. The next columns (7 and 11, respectively) each comprise a Mitigation Vector (MIT) for each Mitigation (MIT1 and MIT2). These Mitigation Vectors are calculated as follows. If the associated LoF reduction is 0, then the MIT value is 0. Otherwise the value is the residual CoF, or 1 minus the CoF reduction column. As a final step, an Effective CoF column is calculated as the product of the unmitigated CoF column and the two MIT columns. For example, row 1 of the Effective CoF is 4.9, the product of column 3 and 7. The bottom row, 3.6, is the product of column 3, 7 and 11. The Sparse Monte Carlo approach makes use of the Trial (column 1) and the Effective CoF (column 12), and thus mitigations may be efficiently specified and implemented into the simulation.

FIGS. 12-21 illustrate and relate to a computer software implementation of the technique described in FIGS. 11A and 11B to the exemplary problem of managing safety risk on a hypothetical gas pipeline.

Various modules in such a software application may include:

FIG. 12A shows a simulation setup panel using sparse non-congruent simulation in a commercially used application to model pipeline safety risk. One of the advantages of Sparse Monte Carlo is that the number of trials may be changed by filtering the database to include the desired detail. In FIG. 12A, the simulation includes all segments of the gas pipeline, and for faster computation the virtual sample size (number of trials) in the upper left is set to 10,000.

Figure 12B:
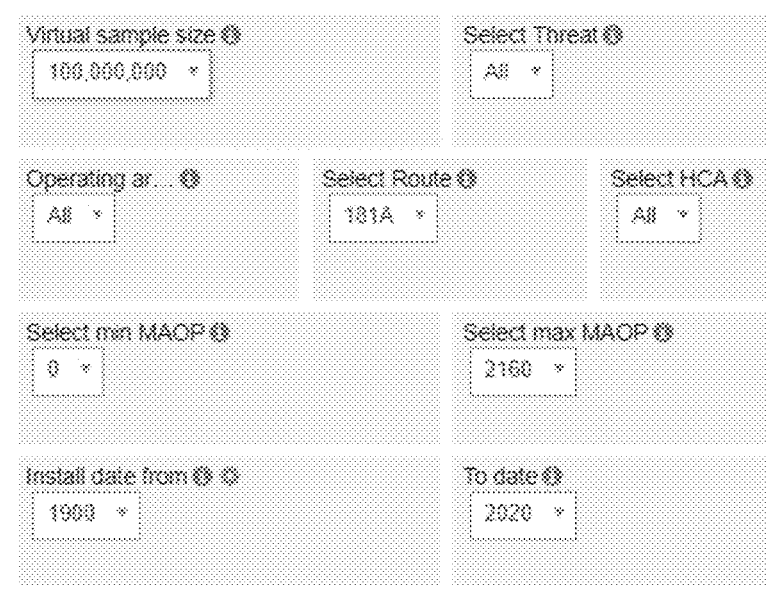

FIG. 12B shows a different configuration of the simulation setup panel in FIG. 12A. The simulation has now been focused on only a single pipeline route and the trials have been increased to 100 million.

FIG. 13 depicts the input specifications of a set of gas pipe safety mitigation projects in a commercially used application following the approach of FIG. 11A. In this case we see that each mitigation has an associated effectiveness against each of 15 safety threats. These threats include such things as corrosion, accidental dig-ins and earthquakes on various faults.

Figure 14:
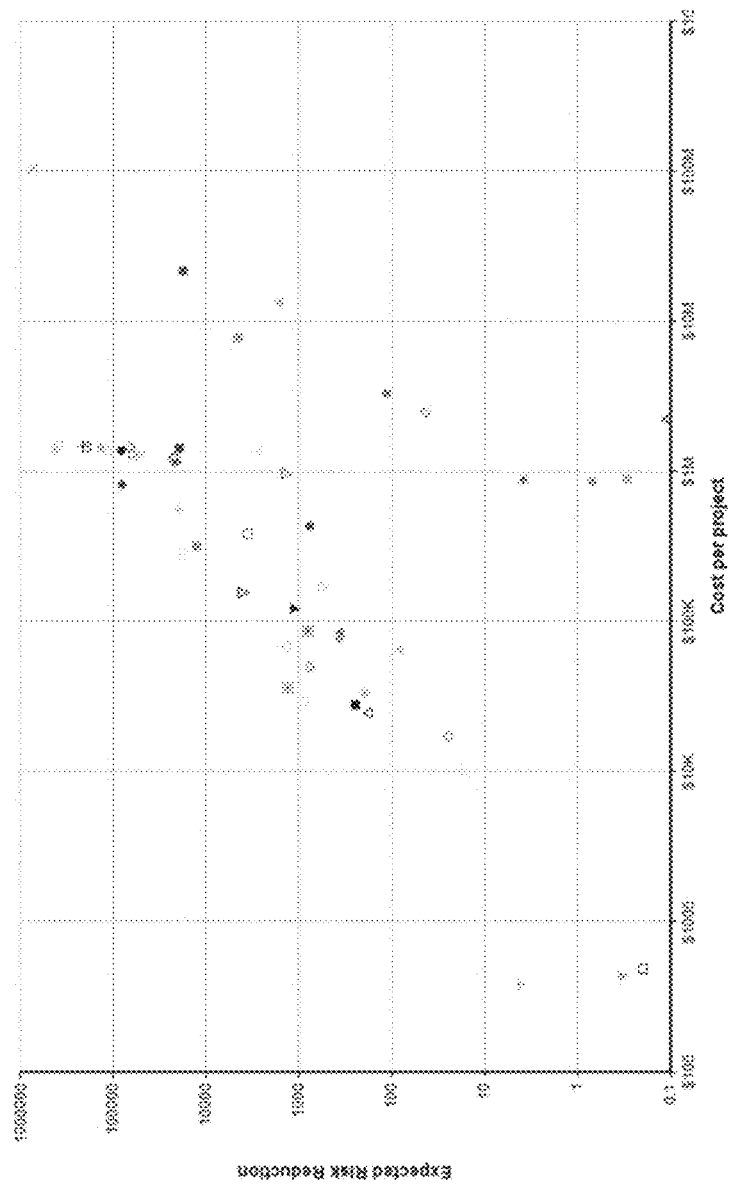
FIG. 14 shows the relative cost/effectiveness of multiple gas pipe safety mitigation projects in a commercially used application according to an embodiment.

FIG. 14 shows the relative cost/effectiveness of multiple gas pipe safety mitigation projects in a commercially used application. The horizontal axis is the cost of a project and the vertical axis is its risk reduction, which might measure, for example the number of people evacuated due to a gas leak. Projects in the lower right are costly and ineffective, and therefore should be avoided. Projects in the upper left are more efficient in reducing risk.

Figure 15:
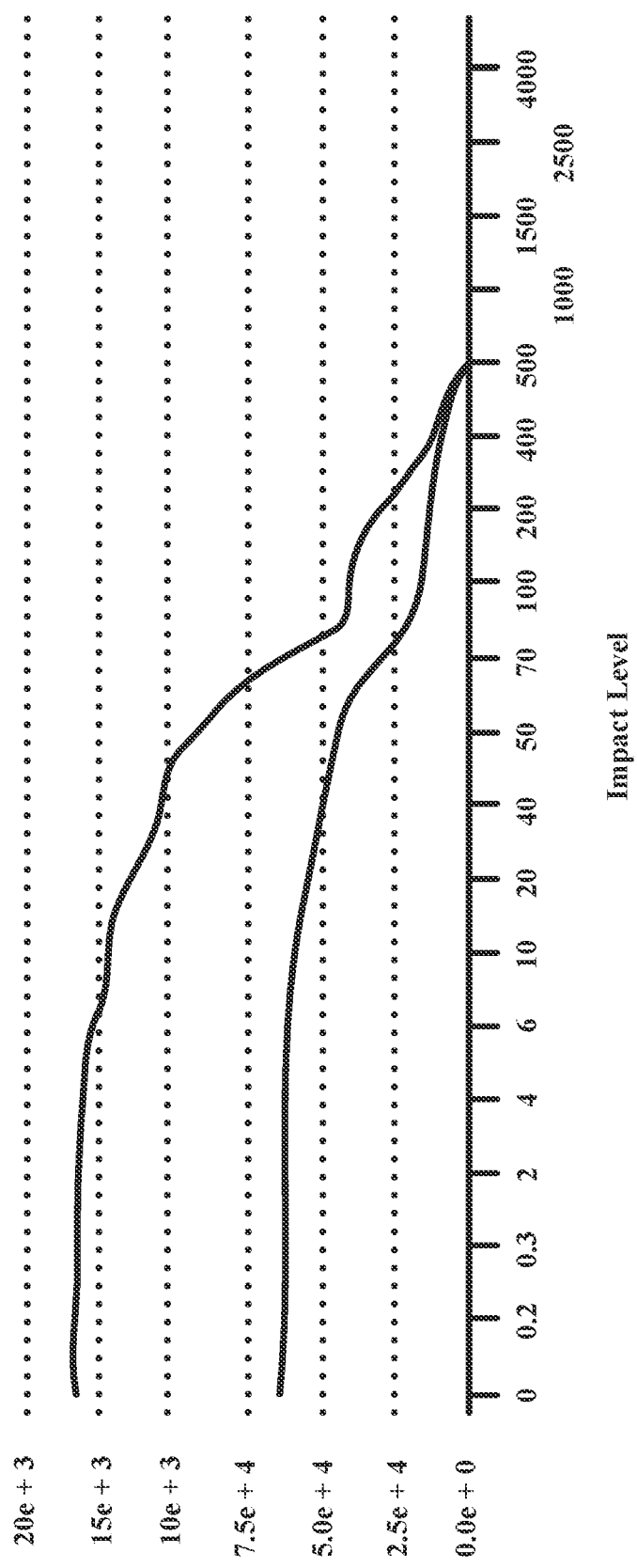
FIG. 15 shows a graph of risk exceedance pre- and post-mitigation in a commercially used application according to an embodiment.

FIG. 15 shows a graph of risk exceedance pre-mitigation and post-mitigation in a commercially used application. This graph may be used to compare the risk of a set of segments with or without mitigation, or to compare the exceedance curves of two potential mitigation projects. The horizontal axis represents safety risk impact, while the vertical axis is the probability that impact will exceed the number on the horizontal axis. The upper curve has higher probability of exceeding and level of impact, and therefore displays more risk than the lower curve.

Figure 16:
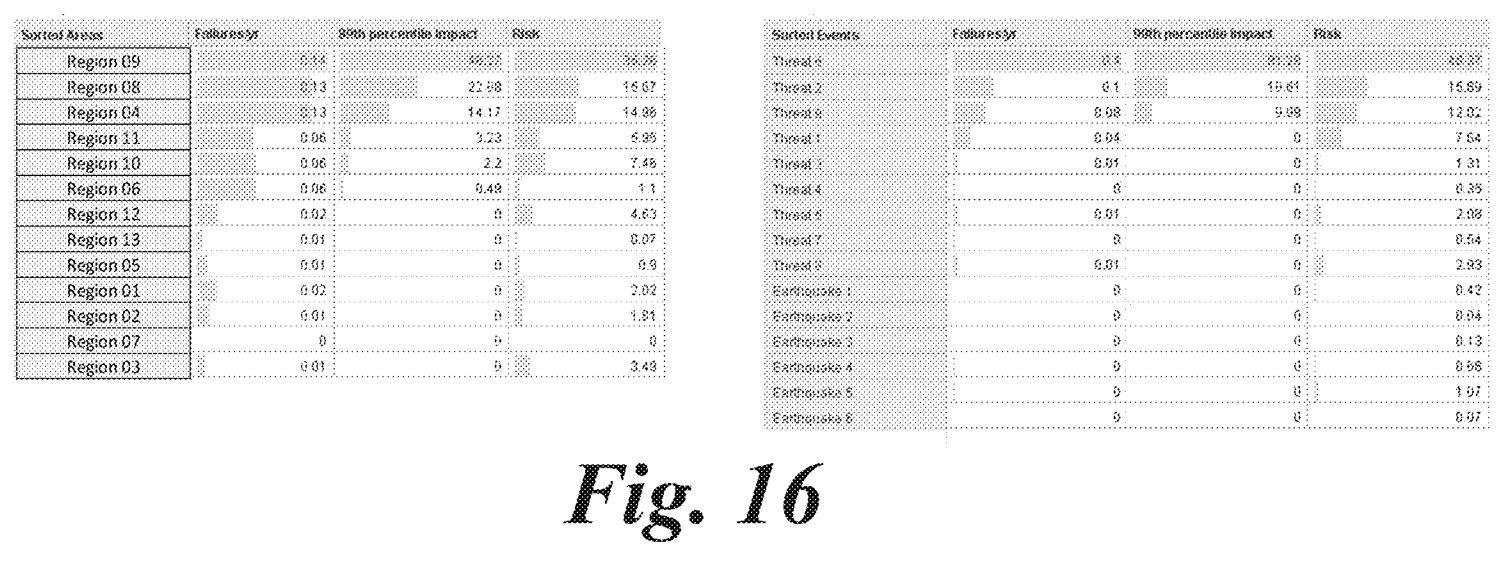

FIG. 16 shows a graphical display of a dynamic risk ranking in a commercially used application. It simultaneously ranks multiple measures, such as the average number of people evacuated per year, $90^{th}$ percentile risk, etc. For example FIG. 16 shows that the results of the analysis using the system of the present invention indicate that the most risky region, by far, is Region 09 (35.26 evacuated per year) and that the riskiest threat, also by far, is Threat 6 (48.37 evacuated per year).

Figure 17:
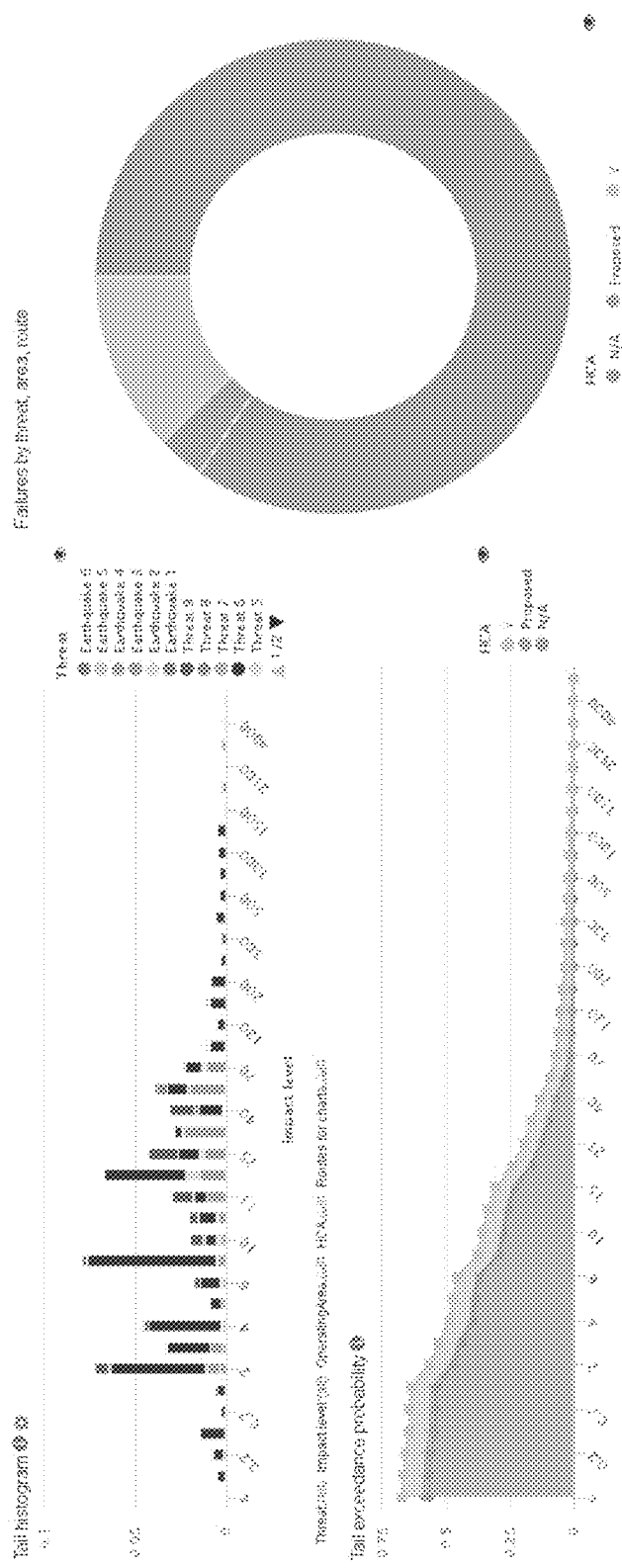
FIG. 17 shows a graphical display of a system wide risk roll-up in a commercially used application according to an embodiment.

FIG. 17 shows a graphical display of a system wide risk roll-up in a commercially used application implementing aspects of the present invention. This display allows risks to be aggregated by region, threat type or other desired criteria.

Figure 18:
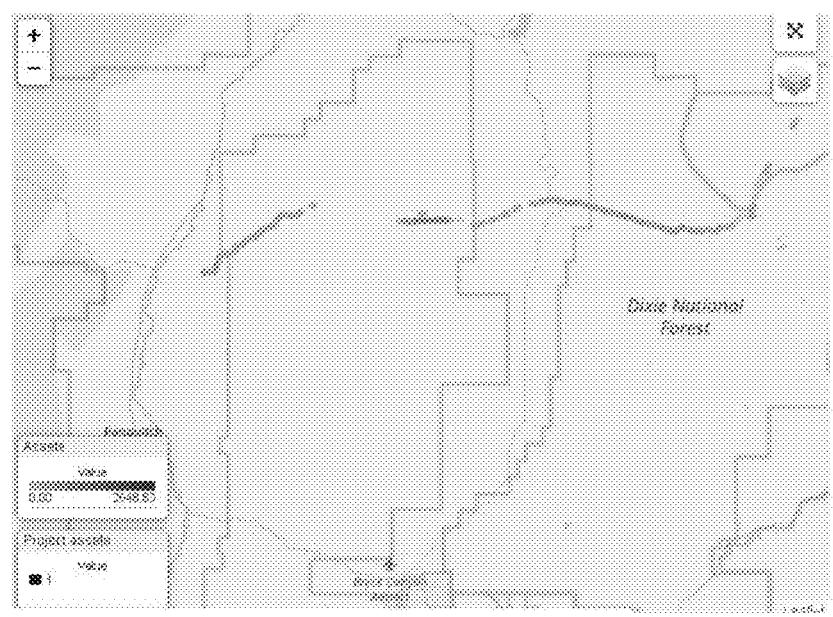
FIG. 18 shows a graphical display of elements of a hypothetical gas pipeline in a commercially used application, in which the colors of the elements may be mapped into various risk metrics according to an embodiment.

FIG. 18 shows a graphical display of elements of a hypothetical gas pipeline in a commercially used application implementing aspects of the present invention, in which the colors (or relative grayscale intensity) of the elements may be mapped into various risk metrics such as operating pressure, average risk per mile, LoF per mile, CoF per mile, etc.

Figure 19:
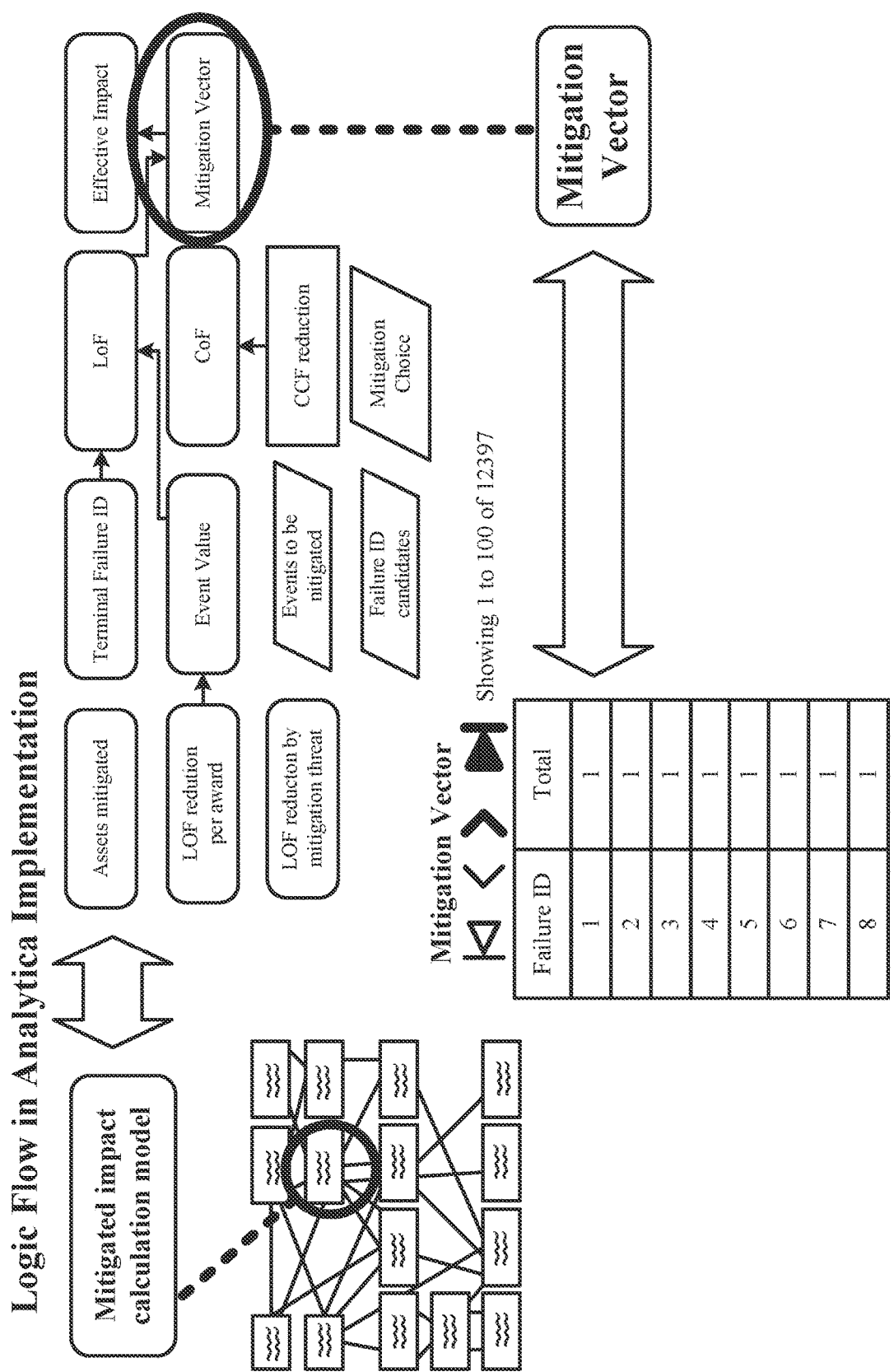
FIG. 19 depicts a mitigation vector flow diagram using sparse non-congruent simulation in a commercially used application, following the steps shown in FIG. 11B.

FIG. 19 depicts a mitigation vector flow diagram using sparse non-congruent simulation in a commercially used application implementing aspects of the present invention, following the steps in FIG. 11B.

Figure 20:
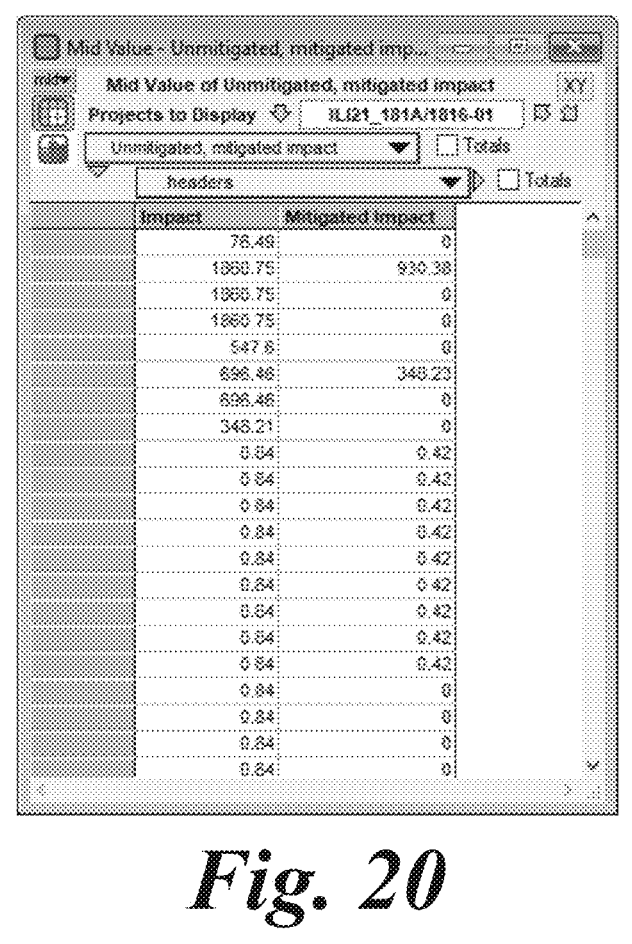

FIG. 20 depicts the effective mitigation in a commercially used application implementing aspects of the present invention, analogous to the last column of FIG. 11B.

FIG. 21 is a sample of code from a commercial application implementing aspects of the present invention that implements aspects of sparse non-congruent simulation as described above.

Through execution of program instructions or algorithms to effect, for example, multiplication within or across cells or pivot tables in Excels, the LoF and CoF reduction mitigations are combined into a single program step or output value for further processing within the system. This process can be applied to two or more mitigations by further execution of program instructions or algorithms to multiply at least some, but preferably each pair of LoF and CoF data values in the database together.

The process of selecting assets, generating trial numbers, selecting CoF values, and creating permuted fractions from 1/N to N/N where N is the number of trials generated preferably includes methods previously described in this application above.

For some or preferably each mitigation, (herein denoted "MIT-1" through "MIT-G", proposed to be applied to one or more assets denoted from "S1" through "SR":

An input of LoF reduction (K) and CoF reduction (M) from 0% to 100% is entered by the user into to the system for further processing. A column, denoted "LoF<i> reduction" for the i-th mitigation, is created with N rows. The contents of the column are as follows: for each trial number (n), a logical test where (if the associated permuted fraction is greater than K, return 1, otherwise return 0), denoted Qn.

A matching column, denoted MITi, is created. The program instructions executed by the system cause each cell in the column to multiply Qn*(1−M) for that trial number n.

The program instructions then cause the system to Repeat steps (1) and (2) for each additional mitigation proposed to be applied to the asset. Order of mitigations does not matter.

The program instructions executed by the system then further cause a resultant column called "Effective CoF" to be created for the asset, which is preferably the product of the CoF by the MITi's of the asset. The resulting value is both LoF and CoF mitigated.

The program instructions executed by the system then further cause steps 1 through 4 to be repeated for each asset from S1 to SR, with or without recursion. Resulting values are displayed to the user in a report, or on the screen, or provided for further processing by other systems or routines.

While various aspects of the present disclosure have been illustrated and described, as noted above, many changes can be made without departing from the spirit and scope of the disclosure. Accordingly, the scope of the disclosure is not limited by the disclosure of the above examples. Instead, the bounds of the disclosure should be determined entirely by reference to the claims that follow.

What is claimed is:

1. A computer-implemented method for merging at least two simulations having different likelihood of occurrences and statistically combining the results, the method comprising:

generating a Z1 number of first sparse simulation trials for the occurrence of a first event having a first likelihood of occurrence out of X total number of trials, wherein each of the first sparse simulation trials is associated with a first trial number;

generating a Z2 number of second sparse simulation trials for the occurrence of a second event having a second likelihood of occurrence out of Y total number of trials, wherein the second likelihood of occurrence is different from the first likelihood of occurrence, wherein each of the second sparse simulation trials is associated with a second trial number;

expanding each of the second trial numbers to a range of trial numbers to normalize the second sparse simulation trials to the first sparse simulation trials;

weighting each of the second trials numbers based on the normalization;

combining the first sparse simulation trials with the second sparse simulation trials into resulting trials;

outputting the combined resulting trials, wherein the combined resulting trials represent an aggregated outcome of the first likelihood of occurrence of the first event and the second likelihood of occurrence of the second event;

identifying one or more risk metrics based at least in part on the combined resulting trials, associating the one or more risk metrics with respective at least one of colors and shades of elements of an asset representing the combined resulting trials; and displaying in a graphical display the respective at least one of colors and shades of the elements.

2. The method of claim 1, wherein weighting each of the second trials numbers based on the normalization further comprising:

comparing the first trials numbers with the expanded second trial numbers;

adjusting the weights associated with at least one of the first trial numbers or the second trial numbers if there is an overlap in trial numbers.

3. The method of claim 2, wherein weighting each of the second trials numbers based on the normalization further comprising:

assigning weights of 1/X to non-overlapping trial numbers.

4. The method of claim 2, wherein adjusting the weights associated with at least one of the first trial numbers or the second trial numbers if there is an overlap in trial numbers further comprises:

weighting the second trials numbers based on a number of non-overlapping trial numbers.

5. The method of claim 4, wherein weighting each of the second trials numbers based on the normalization further comprising:

assigning weights of 1/X to non-overlapping trial numbers.

6. The method of claim 1, wherein the first likelihood of occurrence of the first event corresponds to a first asset of a system and the second likelihood of occurrence of the second event corresponds to a second asset of the system.

7. The method of claim 1 wherein X equals up to 1 million.

8. The method of claim 1 wherein Y equals up to 1 million.

* * * * *